US012656946B2

(12) United States Patent
Park et al.

(10) Patent No.: US 12,656,946 B2
(45) Date of Patent: Jun. 16, 2026

(54) STORAGE DEVICE AND A METHOD OF OPERATING THE SAME

(71) Applicant: SAMSUNG ELECTRONICS CO., LTD., Suwon-si (KR)

(72) Inventors: Dohyeon Park, Suwon-si (KR); Dongeun Shin, Suwon-si (KR); Jinhyuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/231,829

(22) Filed: Aug. 9, 2023

(65) Prior Publication Data

US 2024/0220103 A1     Jul. 4, 2024

(30) Foreign Application Priority Data

Jan. 3, 2023     (KR) ........................ 10-2023-0000742

(51) Int. Cl.
*G06F 3/06*               (2006.01)
(52) U.S. Cl.
CPC ............ *G06F 3/0604* (2013.01); *G06F 3/064* (2013.01); *G06F 3/0653* (2013.01); *G06F 3/0688* (2013.01)
(58) Field of Classification Search
CPC ..... G06F 3/0604; G06F 3/0653; G06F 3/0688
USPC ........................................................ 711/100
See application file for complete search history.

(56) References Cited

U.S. PATENT DOCUMENTS

| | | | |
|---|---|---|---|
| 8,327,224 B2 | 12/2012 | Larsen et al. | |
| 9,032,245 B2 | 5/2015 | Roh | |
| 10,001,927 B1* | 6/2018 | Trachtman | G06F 3/0659 |
| 10,108,470 B2 | 10/2018 | Kathawala et al. | |
| 10,459,793 B2 | 10/2019 | Bandic et al. | |
| 10,467,094 B2 | 11/2019 | Kim et al. | |
| 10,705,749 B2 | 7/2020 | Cheng | |
| 10,719,445 B1* | 7/2020 | Navon | G06F 12/0868 |
| 10,915,399 B2 | 2/2021 | Tao et al. | |
| 11,081,200 B1* | 8/2021 | Parthasarathy | G11C 29/028 |
| 2008/0288814 A1* | 11/2008 | Kitahara | G06F 11/073 714/5.1 |
| 2009/0132875 A1* | 5/2009 | Kitahara | G11C 16/3418 714/721 |
| 2013/0232289 A1* | 9/2013 | Zhong | G11C 16/3495 711/102 |
| 2014/0156966 A1* | 6/2014 | Ellis | G06F 3/064 711/173 |

(Continued)

*Primary Examiner* — Gautam Sain
(74) *Attorney, Agent, or Firm* — Morgan, Lewis & Bockius LLP

(57)               ABSTRACT

A method of operating a storage device including a plurality of nonvolatile memory devices and a storage controller, including: generating a parity chunk by performing a redundant array of independent disks (RAID) encoding on a plurality of data chunks; storing a data stripe including the plurality of data chunks and the parity chunk in a plurality of memory blocks included in the plurality of nonvolatile memory devices; and performing a direct read operation or an indirect read operation based on an operating state of the storage device such that in the direct read operation a target data chunk is directly read from the plurality of nonvolatile memory devices, and in the indirect read operation the target data chunk is generated by performing a RAID decoding.

19 Claims, 17 Drawing Sheets

(56)  References Cited

U.S. PATENT DOCUMENTS

| | | | |
|---|---|---|---|
| 2015/0058537 A1* | 2/2015 | Shen ..................... | G06F 3/0604 |
| | | | 711/103 |
| 2015/0234612 A1* | 8/2015 | Himelstein ............ | G06F 13/00 |
| | | | 714/6.21 |
| 2019/0384671 A1* | 12/2019 | Chen ................... | G06F 11/1068 |
| 2020/0135280 A1* | 4/2020 | Hu ...................... | G11C 29/028 |
| 2020/0192735 A1* | 6/2020 | Ioannou ................. | G06F 3/064 |
| 2020/0272540 A1* | 8/2020 | Sun ........................ | H10B 43/27 |
| 2023/0289098 A1* | 9/2023 | Liang ................... | G06F 11/108 |

* cited by examiner

FIG. 1

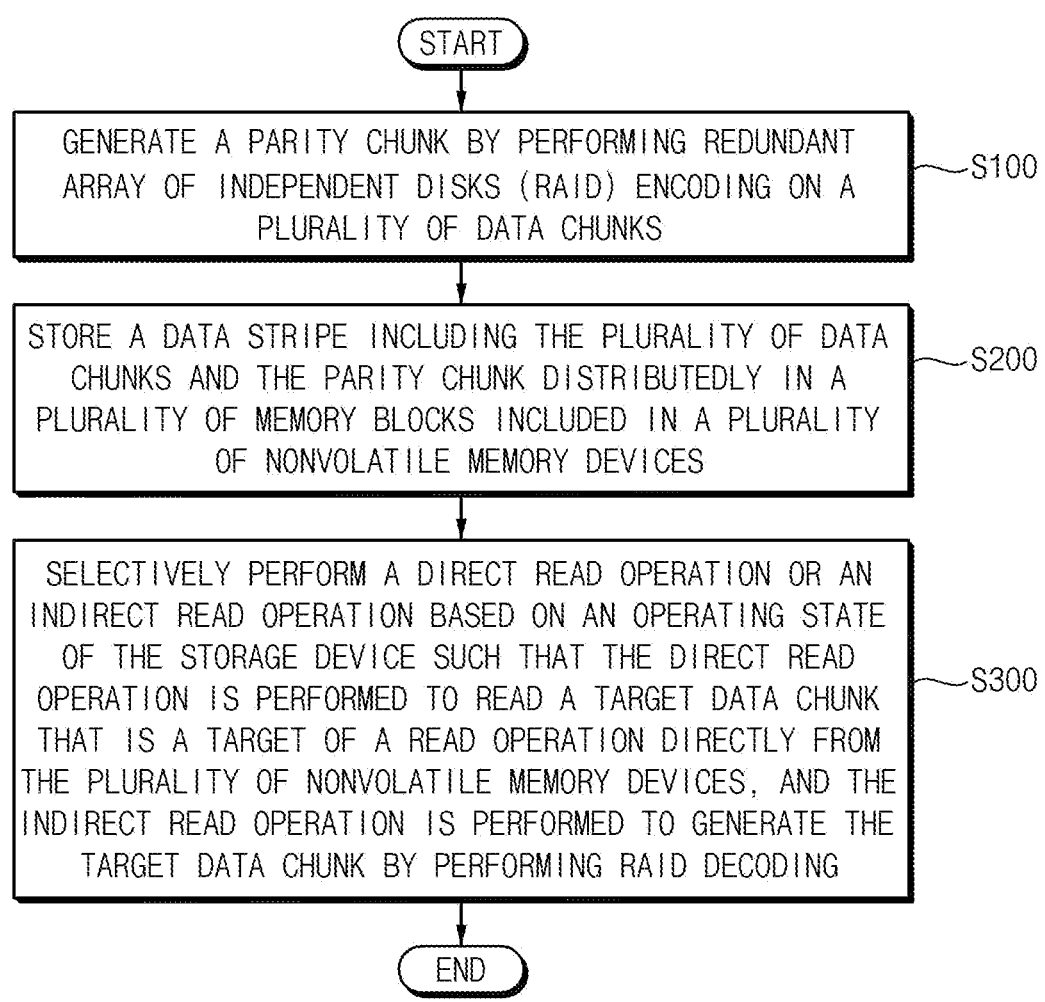

START

GENERATE A PARITY CHUNK BY PERFORMING REDUNDANT ARRAY OF INDEPENDENT DISKS (RAID) ENCODING ON A PLURALITY OF DATA CHUNKS ⌐S100

STORE A DATA STRIPE INCLUDING THE PLURALITY OF DATA CHUNKS AND THE PARITY CHUNK DISTRIBUTEDLY IN A PLURALITY OF MEMORY BLOCKS INCLUDED IN A PLURALITY OF NONVOLATILE MEMORY DEVICES ⌐S200

SELECTIVELY PERFORM A DIRECT READ OPERATION OR AN INDIRECT READ OPERATION BASED ON AN OPERATING STATE OF THE STORAGE DEVICE SUCH THAT THE DIRECT READ OPERATION IS PERFORMED TO READ A TARGET DATA CHUNK THAT IS A TARGET OF A READ OPERATION DIRECTLY FROM THE PLURALITY OF NONVOLATILE MEMORY DEVICES, AND THE INDIRECT READ OPERATION IS PERFORMED TO GENERATE THE TARGET DATA CHUNK BY PERFORMING RAID DECODING ⌐S300

END

FIG. 6

DATA CHUNK

FIG. 12

| NR | SC | NSC |
|----|----|-----|
| 1 | PC | DCa,DCb,DCc |
| 2 | DCc | DCa,DCb,PC |
| 3 | DCb | DCa,DCc,PC |
| 4 | DCa | DCb,DCc,PC |
| 5 | PC | DCa,DCb,DCc |
| ⋮ | ⋮ | ⋮ |

FIG. 13

| BLOCK ADDRESS | RC | NEB |
|---------------|----|----|
| BA1 | C1 | N1 |
| BA2 | C2 | N2 |
| BA3 | C3 | N3 |
| BA4 | C4 | N4 |
| ⋮ | ⋮ | ⋮ |

STORAGE DEVICE AND A METHOD OF OPERATING THE SAME

CROSS-REFERENCE TO RELATED APPLICATION

This U.S. non-provisional application claims priority under 35 U.S.C. § 119 to Korean Patent Application No. 10-2023-0000742, filed on Jan. 3, 2023, in the Korean Intellectual Property Office (KIPO), the disclosure of which is incorporated by reference herein in its entirety.

TECHNICAL FIELD

Example embodiments of the present disclosure relate generally to semiconductor integrated circuits, and more particularly to a storage device and a method of operating a storage device.

DISCUSSION OF THE RELATED ART

Recently, storage devices such as solid state drives (SSDs) have gained significant popularity. Their advantages lie in their superior stability and durability because they do not have mechanical moving parts, and that they have incredibly fast information access speeds and power consumption. As electronic circuits find their way into diverse systems from automobiles, airplanes, and drones to electronic systems such as notebook computers, storage devices like SSDs are being incorporated into a wide range of systems.

During a read operation of a nonvolatile memory device, the application of a read voltage and a pass voltage to control gates of memory cells causes the floating gates of the memory cells to couple and apply voltage. Therefore, due to a voltage difference between the floating gate and the channel, electron tunneling occurs. Even though the read voltage and pass voltage applied to the gate of the memory cell are lower than the voltage during the program operation, repeated read operations can softly program the memory cell, which is referred to as a read disturbance. This disturbance changes the memory cell's threshold voltage and can lead to increased read errors during the read operation.

SUMMARY

Some example embodiments of the present disclosure provide a storage device and a method of operating a storage device, capable of reducing the effects of a read disturbance.

According to example embodiments of the present disclosure, there is provided a method of operating a storage device including a plurality of nonvolatile memory devices and a storage controller, including: generating a parity chunk by performing a redundant array of independent disks (RAID) encoding on a plurality of data chunks; storing a data stripe including the plurality of data chunks and the parity chunk in a plurality of memory blocks included in the plurality of nonvolatile memory devices; and performing a direct read operation or an indirect read operation based on an operating state of the storage device such that in the direct read operation a target data chunk is directly read from the plurality of nonvolatile memory devices, and in the indirect read operation the target data chunk is generated by performing a RAID decoding.

According to example embodiments of the present disclosure, there is provided a method of operating a storage device including a plurality of nonvolatile memory devices and a storage controller, including: generating a parity chunk by performing a RAID encoding on a plurality of data chunks corresponding to consecutive logical addresses of a host device; storing a data stripe including the plurality of data chunks and the parity chunk in a plurality of memory blocks included in the plurality of nonvolatile memory devices; monitoring, based on requests transmitted from the host device, whether an operating state of the storage device is a sequential read state in which the plurality of data chunks are sequentially read; determining a protection chunk among the plurality of data chunks and the parity chunk when the operating state of the storage device is the sequential read state; performing a direct read operation with respect to other data chunks except for one data chunk determined as the protection chunk by reading the other data chunks directly from the plurality of nonvolatile memory devices; reading the parity chunk from the plurality of nonvolatile memory devices; and performing an indirect read operation to generate the one data chunk by performing a RAID decoding on the parity chunk and the other data chunks.

According to example embodiments of the present disclosure, there is provided a storage device including: a plurality of nonvolatile memory devices; and a storage controller configured to control access to the plurality of nonvolatile memory devices based on requests transmitted from a host device, the storage controller performing a direct read operation or an indirect read operation based on an operating state of the storage device such that in the direct read operation a target data chunk is directly read from the plurality of nonvolatile memory devices, and in the indirect read operation the target data chunk is generated by performing a RAID decoding.

The storage device and the method of operating the storage device according to example embodiments of the present disclosure can enhance the performance of the storage device and systems including the storage device by uniformalizing the read disturbance of the memory blocks through the indirect read operation using the RAID decoding and thus prevent the concentration of the read disturbance.

BRIEF DESCRIPTION OF THE DRAWINGS

Example embodiments of the present disclosure will be more clearly understood from the following detailed description taken in conjunction with the accompanying drawings.

FIG. 1 is a flowchart illustrating a method of operating a storage device according to example embodiments.

FIG. 6 is a diagram for describing a method of processing data using a redundant array of independent disks (RAID) scheme in a storage device according to example embodiments.

FIGS. 11 and 12 are diagrams illustrating an example embodiment of determining a protection chunk in a method of operating a storage device according to example embodiments.

FIG. 13 is a diagram illustrating metadata used to determine a protection chunk in a method of operating a storage device according to example embodiments.

DETAILED DESCRIPTION OF THE EMBODIMENTS

Figure 2:
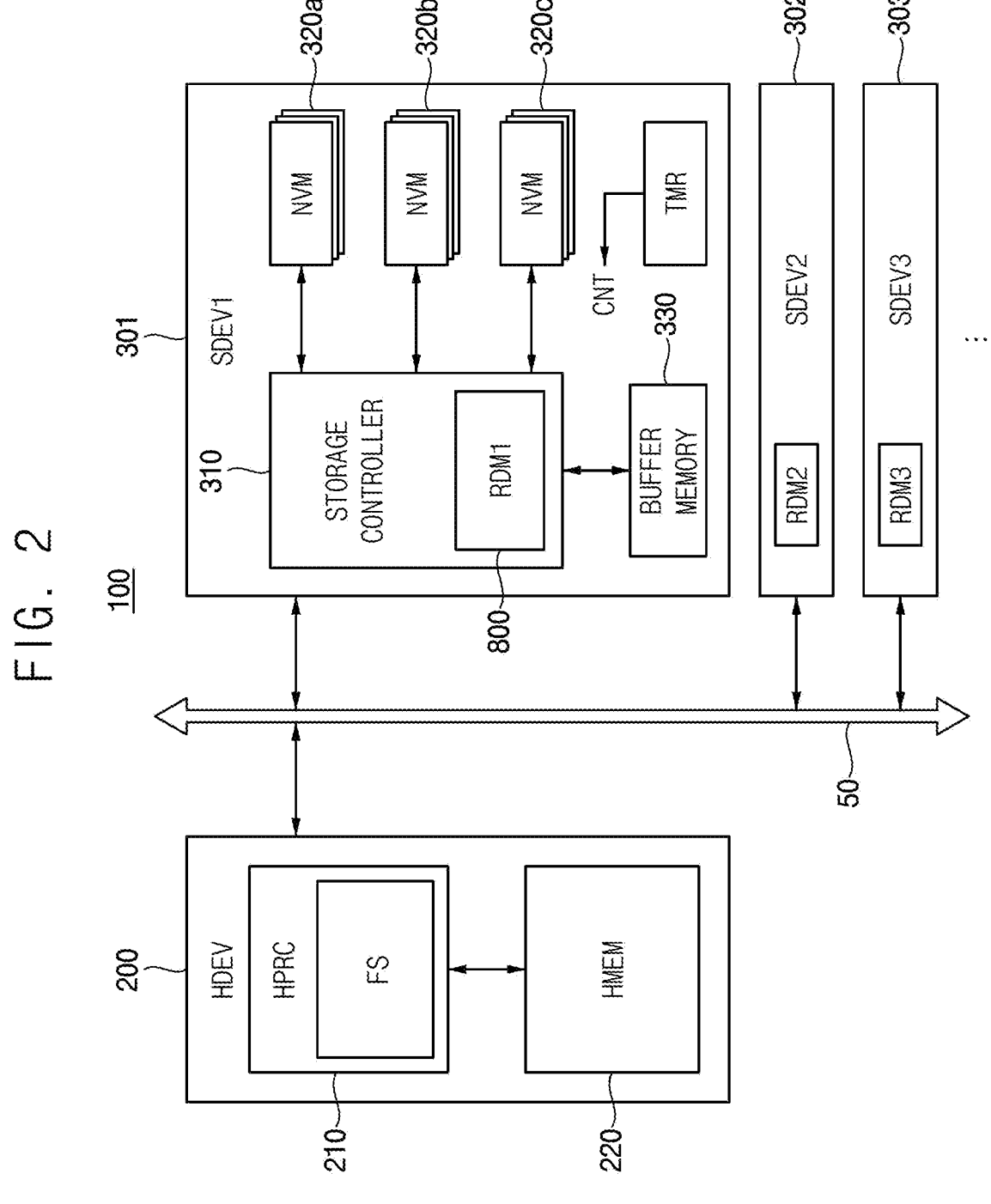
FIG. 2 is a block diagram illustrating a memory system according to example embodiments.

Various example embodiments of the present disclosure will be described more fully hereinafter with reference to the accompanying drawings. In the specification, like numerals may refer to like elements throughout. Repeated descriptions of like elements may be omitted.

Hereinafter, a storage device is assumed to include one or more nonvolatile memory devices and a storage controller for controlling access to the non-volatile memory devices. In addition, the storage device according to example embodiments is a redundant array of independent disks (RAID) storage device having a RAID recovery function as a technique for recovering an uncorrectable error UCE. The uncorrectable error UCE is an error that exceeds the correction capability of an error correction code (ECC) circuit included in the storage device. The storage device according to example embodiments may have a flash recovery function. The flash recovery refers to a process performed on a storage device to solve uncorrectable errors UCE. For example, the flash recovery may include data recovery procedures such as read level adjustment or belly search. RAID recovery is a technology for recovering a data unit in which an uncorrectable error UCE has occurred by using other data units in a RAID stripe in which an uncorrectable error UCE has not occurred.

Various RAID configurations (or layouts) may be referred to as RAID levels. For example, the RAID level RAID 5 may strip data into k data chunks (or data segments) and create one parity chunk to store k+1 chunks respectively into k+1 memory blocks. The RAID level RAID 5 may only provide data recovery for a single failure. For example, parity allows the recovery of data in case of a single disk failure. Hereinafter, example embodiments will be described centering on RAID 5, but are not limited thereto. It will be appreciated that example embodiments may be applied to, in addition to RAID 5, other RAID levels that create at least one parity chunk.

FIG. 1 is a flowchart illustrating a method of operating a storage device according to example embodiments.

Referring to FIG. 1, a parity chunk may be generated by performing redundant array of independent disks (RAID) encoding on a plurality of data chunks (S100). A data stripe including the plurality of data chunks and the parity chunk may be stored distributedly in a plurality of memory blocks included in a plurality of nonvolatile memory devices (S200). The generation of the parity chunk and the distributive storage of the data stripe will be described below with reference to FIGS. 5 and 6.

A direct read operation or an indirect read operation may be selectively performed based on an operating state of the storage device (S300). In this disclosure, the direct read operation is performed to read a target data chunk (i.e., the target of a read operation) directly from the plurality of nonvolatile memory devices. Also in this disclosure, the indirect read operation is performed to generate the target data chunk by performing RAID decoding, instead of reading the target data chunk directly from the plurality of nonvolatile memory devices.

An error correction code (ECC) decoding may be performed on the target data chunk read from the nonvolatile memory devices by the direct read operation to correct an error of the target data chunk. When an uncorrectable error UCE occurs in the target data chunk, the target data chunk may be recovered by flash recovery and/or RAID recovery as described above.

On the other hand, ECC decoding may not be performed on the target data chunk generated by the indirect read operation. The indirect read operation according to example embodiments may be performed without ECC decoding, and the indirect read operation may be distinguished from the RAID recovery that is performed only when an uncorrectable error UCE occurs.

The indirect read operation according to example embodiments may be performed only when the operating state of the storage device satisfies a specific condition.

In an example embodiment, as will be described below with reference to FIG. 9, the indirect read operation may be performed when the operating state of the storage device is a sequential read state in which a plurality of data chunks constituting one data stripe are sequentially read. As will be described below, when the plurality of data chunks constituting one data stripe are sequentially read, the read disturbance of the plurality of memory blocks in which the plurality of data chunks and the parity chunks constituting each data stripe are distributed and stored may become uniform due to the indirect read operation.

In another example embodiment, as will be described below with reference to FIG. 14, the indirect read operation may be performed when the operating state of the storage device is a reclaim operation state in which the data of the memory block in which the target data chunk is stored is moved to and stored in another erased memory block. A read delay due to the reclaim operation may be reduced by the indirect read operation.

When a read operation is performed on a page of a NAND flash device, memory cells of a memory block including the page are subjected to read disturbance, and when the number of read disturbances increases, an uncorrectable error UCE may occur. In addition, the vertical NAND (VNAND) flash memory device has uneven characteristics and as the generations of the VNAN flash memory device progress, it becomes increasingly susceptible to read disturbance.

Presently, a storage device such as a solid state drive (SSD) device uses the RAID technology to recover the uncorrectable errors UCE. However, pages in which the parity chunks are written are not read except for in the RAID recovery process. In other words, since the uncorrectable errors UCE are infrequent, the parity chunks, which contain rarely accessed data, can be considered as cold data. Therefore, only the memory block that includes the page where the data chunk is written is more susceptible to the effects of the read disturbance, and thus, the effect of the read disturbance is uneven. The reliability of the memory block in which the data chunk is written tends to deteriorate quickly.

Since the read operation is also performed on the memory block in which the parity chunk is stored by the indirect read operation according to example embodiments, the effect of the read disturbance may be flattened and made uniform compared to the prior art in which the effect of the read disturbance mainly affects only the memory block in which the data chunk is stored. Accordingly, the reclaim point may be deferred, and thus the performance of the storage device may be enhanced.

As described above, the storage device and the method of operating the storage device according to example embodiments may enhance the performance of the storage device and systems including the storage device by uniformalizing the read disturbance of the memory blocks through the indirect read operation using the RAID decoding and preventing the concentration of the read disturbance.

FIG. 2 is a block diagram illustrating a memory system according to example embodiments.

Referring to FIG. 2, a storage system 100 includes a host device HDEV 200 and one or more storage devices SDEV1 301, SDEV2 302 and SDEV3 303.

The host device 200 and the storage devices 301, 302 and 303 may be connected to an interconnector 50 and communicate signals and/or data through the interconnector 50. The interconnector 50 may be a network fabric. The interconnector 50 may be implemented with any suitable networking protocol and/or medium, such as Ethernet, Fiber Channel, InfiniBand, etc., as well as either directly or through intermediary devices such as switches, hubs, etc., which may be part of the interconnector 50. The interconnector 50 may be implemented with any other communication or interconnect protocol that may enable communication between the host device 200 and the storage devices 301, 302 and 303, such as PCIe (peripheral component interconnect express), SATA (Serial Advanced Technology Attachment), SAS (Serial Attached SCSI (Small Computer System Interface)), Ocu-Link, etc.

The host device 200 may control overall operations of the storage system 100. The host device 200 may include a host processor 210 and a host memory 220.

The host processor 210 may control an operation of the host device 200. For example, the host processor 210 may execute an operating system (OS). A file system FS may be implemented as software and a portion of the OS. The host processor 210 may execute various applications running on the OS. The host processor 210 may be a homogeneous multi-core processor or a heterogeneous multi-core processor. For example, the host processor 210 may be a processor that includes at least two processor cores independently executing program instructions.

The host memory 220 may store instructions and/or data that are executed and/or processed by the host processor 210. For example, the OS or applications may be loaded into the host memory 220 during booting. For example, when the storage system 100 boots, the OS stored in one of the storage devices 301, 302 and 303 may be loaded into the host memory 220, and then applications may be loaded by the OS into the host memory 220.

FIG. 2 illustrates three storage devices for convenience of illustration and description, and example embodiments are not limited to a particular number of storage devices. As such, the storage system 100 may include more than three storage devices or less than three storage devices. In some example embodiments, the storage system 100 may include a single storage device. Hereinafter example embodiments are described based on the one storage device 301, and the other storage device 302 and 303 may have the same or similar configuration.

The storage device 301 may be accessed by the host device 200. For example, the storage device 301 is communicably coupled to the host device 200. The storage device 301 may include a storage controller 310, a plurality of nonvolatile memories (NVM) 320a, 320b and 320c, a buffer memory 330 and a storage timer TMR providing time information CNT.

The storage controller 310 may control an operation of the storage device 301. For example, the controller 310 may control a data write operation and/or a data read operation, based on requests and data that are received from the host device 200.

The plurality of nonvolatile memories 320a, 320b and 320c may store a plurality of data. For example, the plurality of nonvolatile memories 320a, 320b and 320c may store the meta data, various user data, or the like.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

The buffer memory 330 may store instructions executed by the storage controller 310 and/or data processed by the storage controller 310. According to an example embodiment, the buffer memory 330 may temporarily store data stored in the plurality of nonvolatile memories 320a, 320b and 320c or may temporarily store data to be stored into the plurality of nonvolatile memories 320a, 320b and 320c. For example, the buffer memory 300 may store data to be written to or data read from the plurality of nonvolatile memories 320a, 320b and 320c. The buffer memory 330 may include at least one of various volatile memories, e.g., a static random access memory (SRAM), a dynamic RAM (DRAM), or the like.

In some example embodiments, the storage device 301 may be a universal flash storage (UFS). In other example embodiments, the storage device 301 may be a solid state drive (SSD), a multi-media card (MMC) or an embedded multi-media card (eMMC). In still other example embodiments, the storage device 301 may be one of a secure digital (SD) card, a micro SD card, a memory stick, a chip card, a universal serial bus (USB) card, a smart card, a compact flash (CF) card, or the like.

In some example embodiments, the storage device 301 may be connected to the host device 200 through the interconnector 50 which may include, for example, a UFS, an eMMC, a serial advanced technology attachment (SATA) bus, a nonvolatile memory express (NVMe) bus, a serial attached SCSI (SAS) bus, or the like.

The storage device 301 may include a read disturbance manager RMD1 800 that controls the indirect read operation according to example embodiments. The other storage devices 302 and 303 may include read disturbance managers RDM2 and RDM3, respectively. FIG. 2 illustrates that the read disturbance manager RDM1 is included in the storage controller 310. In some example embodiments, the read disturbance manager RDM1 may be implemented as independent hardware logic distinct from the storage controller 310. For example, the read disturbance manager RDM1 may be external to the storage controller 310 according to another example embodiment.

Figure 3:
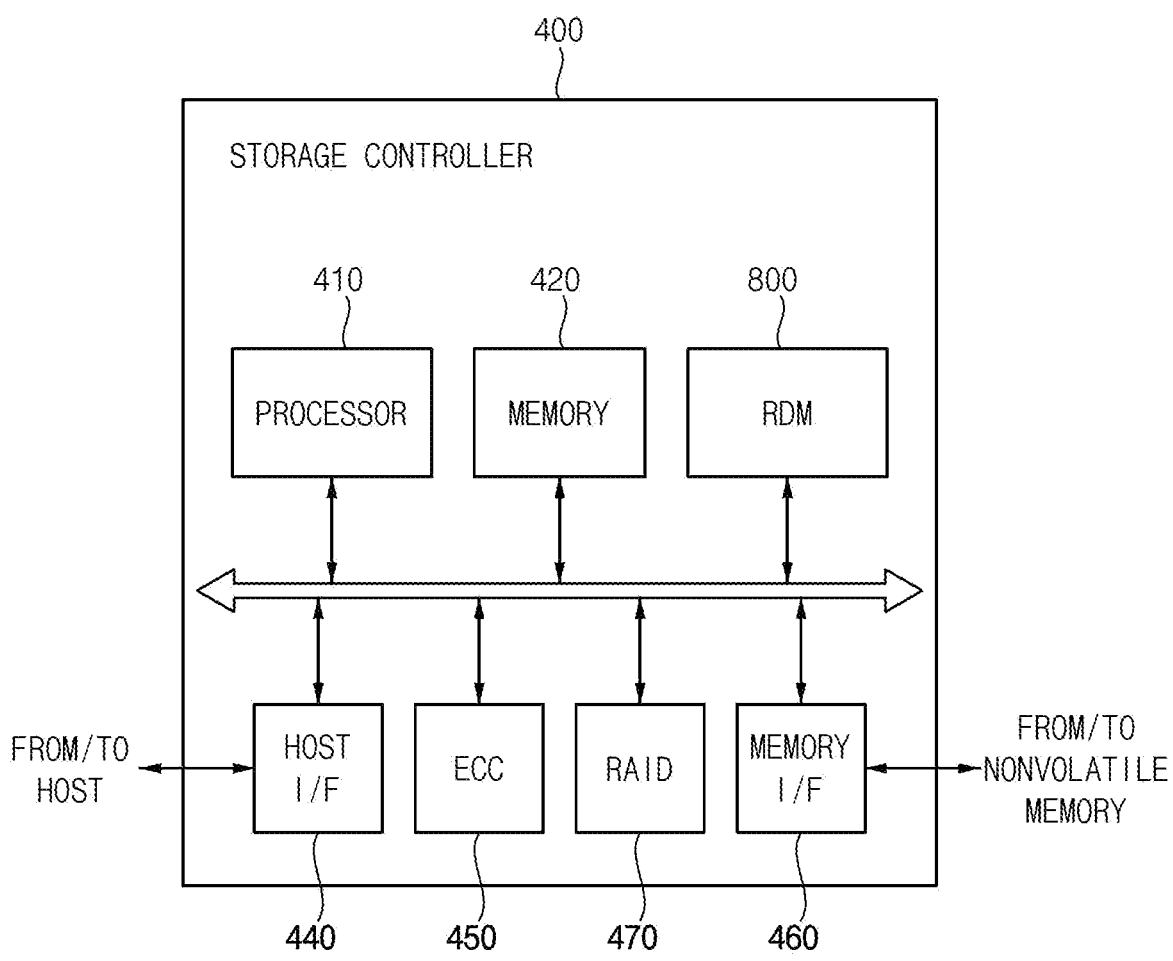
FIG. 3 is a block diagram illustrating an example embodiment of storage controller included in a storage device according to example embodiments.

FIG. 3 is a block diagram illustrating an example embodiment of storage controller included in a storage device according to example embodiments.

Referring to FIG. 3, a storage controller 400 may include a processor 410, a memory 420, a read disturbance manager RDM 800, a host interface (I/F) 440, an error correction code (ECC) engine 450, a memory interface (I/F) 460 and a RAID controller 470.

The processor 410 may control an operation of the storage controller 400 in response to requests received via the host interface 440 from a host device (e.g., the host device 200 in FIG. 2). For example, the processor 410 may control an operation of a storage device (e.g., the first storage device 301 in FIG. 2), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The read disturbance manager 800 may control the indirect read operation as described above. As will be described below with reference to FIG. 4, the read disturbance manager 800 may provide information on a data chunk that is a target of the indirect read operation. According to example embodiments, the read disturbance manager 800 may be implemented as a software program executed by the processor 410, hardware logic, or firmware.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), etc., format.

The memory interface 460 may communicate data with a nonvolatile memory (e.g., the nonvolatile memories 320a, 320b and 320c in FIG. 2). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle or open NAND flash interface (ONFI).

The RAID controller 470 may be implemented to perform a conventional RAID recovery function. The RAID controller 470 may also be implemented to perform the indirect read operation according to example embodiments.

The storage controller 400 may include an Advanced Encryption Standard (AES) engine. The AES engine may perform at least one of an encryption operation and a decryption operation on data input to the storage controller 400 using a symmetric-key algorithm.

Figure 4:
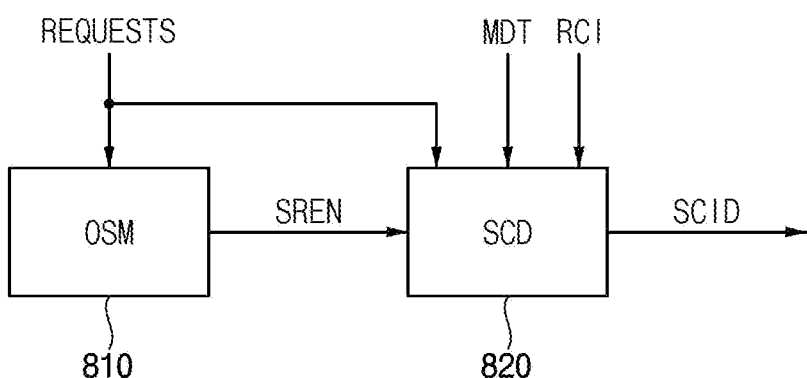
FIG. 4 is a block diagram illustrating an example embodiment of a read disturbance manager included in a storage device according to example embodiments.

FIG. 4 is a block diagram illustrating an example embodiment of a read disturbance manager included in a storage device according to example embodiments.

Referring to FIG. 4, a read disturbance manager 800 may include an operating state monitor OSM 810 and a protection chunk determiner SCD 820.

The operating state monitor 810 may generate a sequential read enable signal SREN indicating whether the present operating state of the storage device is a sequential read state based on requests transmitted from the host device. For example, the sequential read enable signal SREN may indicate that the storage device is in a sequential read state. In an example embodiment, the operating state monitor 810 may determine that the present operating state of the storage device is a sequential read state when read requests among the requests provided from the host device include consecutive logical addresses of the host device. The operating state monitor 810 may activate the sequential read enable signal SREN when in the sequential read state and deactivate the sequential read enable signal SREN when not in the sequential read state. For example, the sequential read enable signal SREN may have a high level in the sequential read state and a low level when not in the sequential read state.

The protection chunk determiner 820 may determine whether the present operating state of the storage device is a sequential read state based on the sequential read enable signal SREN. When the storage device is in the sequential read state, the protection chunk determiner 820 may determine a protection chunk that is a target of an indirect read operation from among a plurality of data chunks and parity chunks included in each data stripe.

In an example embodiment, the protection chunk determiner 820 may generate a protection chunk identifier SCID (e.g., a logical address corresponding to the protection chunk) representing the protection chunk that is the target of the indirect read operation and provides the generated protection chunk identifier SCID to the processor 410 of FIG. 3. The processor 410 may control the RAID controller 470 to perform the indirect read operation with respect to the protection chunk based on the protection chunk identifier SCID.

The protection chunk determiner 820 may receive metadata MDT to determine the protection chunk. The metadata MDT is used to manage the storage device including the nonvolatile memory device such as a flash memory and the like, and includes file information, mapping relationships between a logical address of the host device and a physical address of the nonvolatile memory device, a mapping table including address information of data chunks and parity chunks constituting a data stripe, information on the reliability of memory blocks and pages, state information on usable free block and page areas, bad block information, etc. Example embodiments of determining the protection chunk will be described below with reference to FIGS. 10 through 13.

In some example embodiments, the protection chunk determiner 820 may determine a protection chunk that is a target of the indirect read operation based on reclaim information RCI. The reclaim information RCI may include information (e.g., a block address) of a memory block that is a target of a reclaim operation currently being performed. When the storage device is in a reclaim operation state in which data of a memory block in which a target data chunk is stored is moved to and stored in another erased memory block, the protection chunk determiner 820 may determine the target data chunk as the protection chunk that is a target of the indirect read operation. In other words, during a reclaim operation, when data from a memory block containing a target data chunk is transferred and stored in a different, erased memory block, the protection chunk determiner 820 can designate the target data chunk as the protection chunk. This protection chunk being the target of the indirect read operation. The protection chunk determiner 820 may generate the protection chunk identifier SCID indicating the protection chunk (e.g., a logical address corresponding to the protection chunk) and provide the generated protection chunk identifier SCID to the processor 410 of FIG. 3. The processor 410 may control the RAID controller 470 to perform the indirect read operation on the protection chunk based on the protection chunk identifier SCID regardless of whether the reclaim operation is completed.

Figure 5:
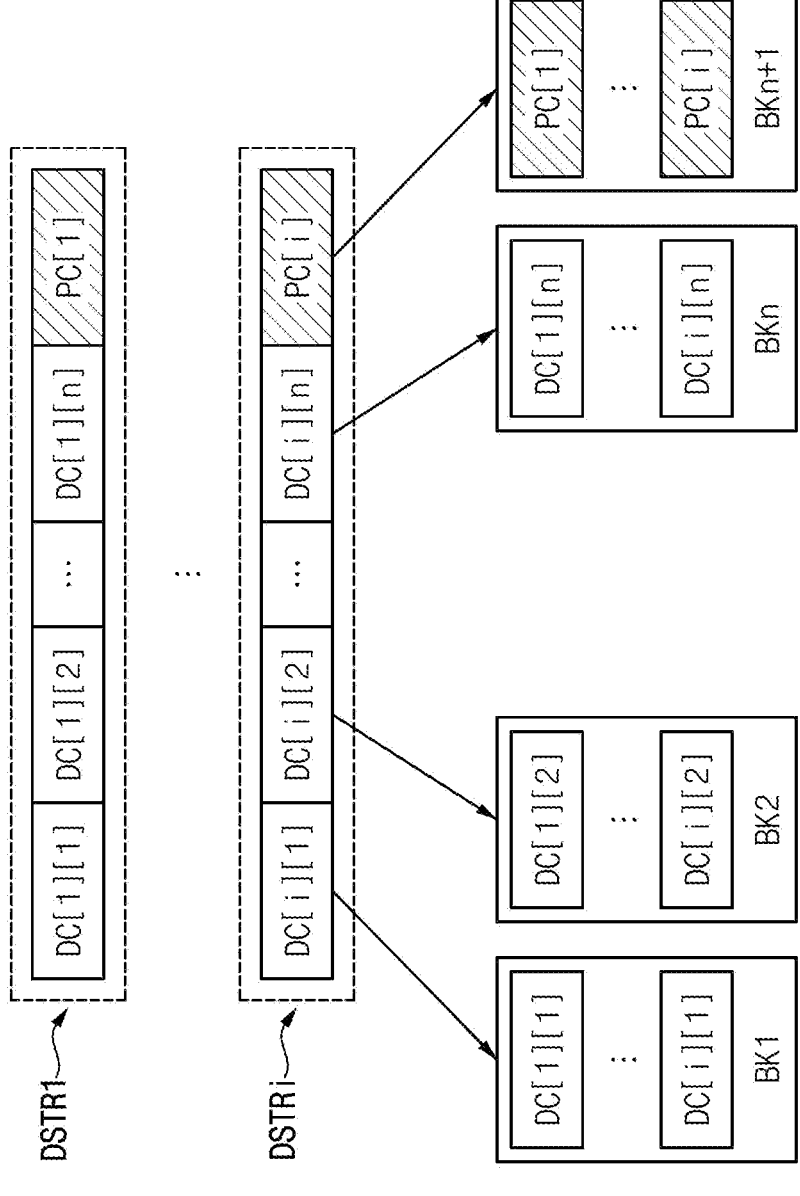
FIG. 5 is a diagram for describing a method of storing data in a storage device according to example embodiments.

FIG. 5 is a diagram for describing a method of storing data in a storage device according to example embodiments.

A storage device according to example embodiments may employ a RAID configuration for dividing one piece of data and distributing and storing the divided "data chunks" in several memory blocks. In an example embodiment, memory blocks for distributed storage may be included in different nonvolatile memory devices (e.g., semiconductor chips), and the different nonvolatile memory devices may be connected to a storage controller through different channels. Since a plurality of memory blocks rarely cause problems at the same time, a RAID storage system may improve reliability of the stored data.

Data may be transmitted between the host device and the RAID storage device in units of a "data stripe (hereinafter, data stripe may be referred to simply as "stripe"). The user of the host device or the RAID storage device may select the data size of the stripe, and the data may include one or more stripes.

One stripe may include a plurality of data chunks. Further, the stripe may include a parity, which can be utilized to check for errors within the data chunks. The data chunks and the parity may be distributedly or dispersively stored in the plurality of memory blocks.

For ease of understanding, it may be assumed that i stripes DSTR1~DSTRi are provided from the host device to the RAID storage device, and that each of the i stripes DSTR1~DSTRi includes n data chunks and one parity chunk. According to this assumption, n data chunks and one parity chunk included in one stripe may be distributed and stored in (n+1) memory blocks BK1~ BKn+1.

For example, as shown in FIG. 5, the first memory block BK1 may store first data chunks DC[1][1]~DC[i][1] of the i stripes DSTR1~DSTRi. The second memory block BK2 may store second data chunks DC[1][2]~DC[i][2] of the i stripes DSTR1~DSTRi. The n-th memory block BKn may store n-th data chunks DC[1][n]~DC[i][n] of the i stripes DSTR1~DSTRi. Furthermore, the (n+1)-th memory block BKn+1 may store parity chunks PC[1]~PC[i] of the i stripes DSTR1~DSTRi.

Here, one data chunk may have a data size corresponding to a read unit of a read operation performed in each of the memory blocks BK1~BKn+1. Data stored in the memory blocks BK1~BKn+1 may be read in read units having the same data size as the data chunk.

When such a RAID configuration is employed, even if an error occurs in one data chunk stored in one memory block, the data chunk can be restored by referring to the parity chunk.

Figure 6:
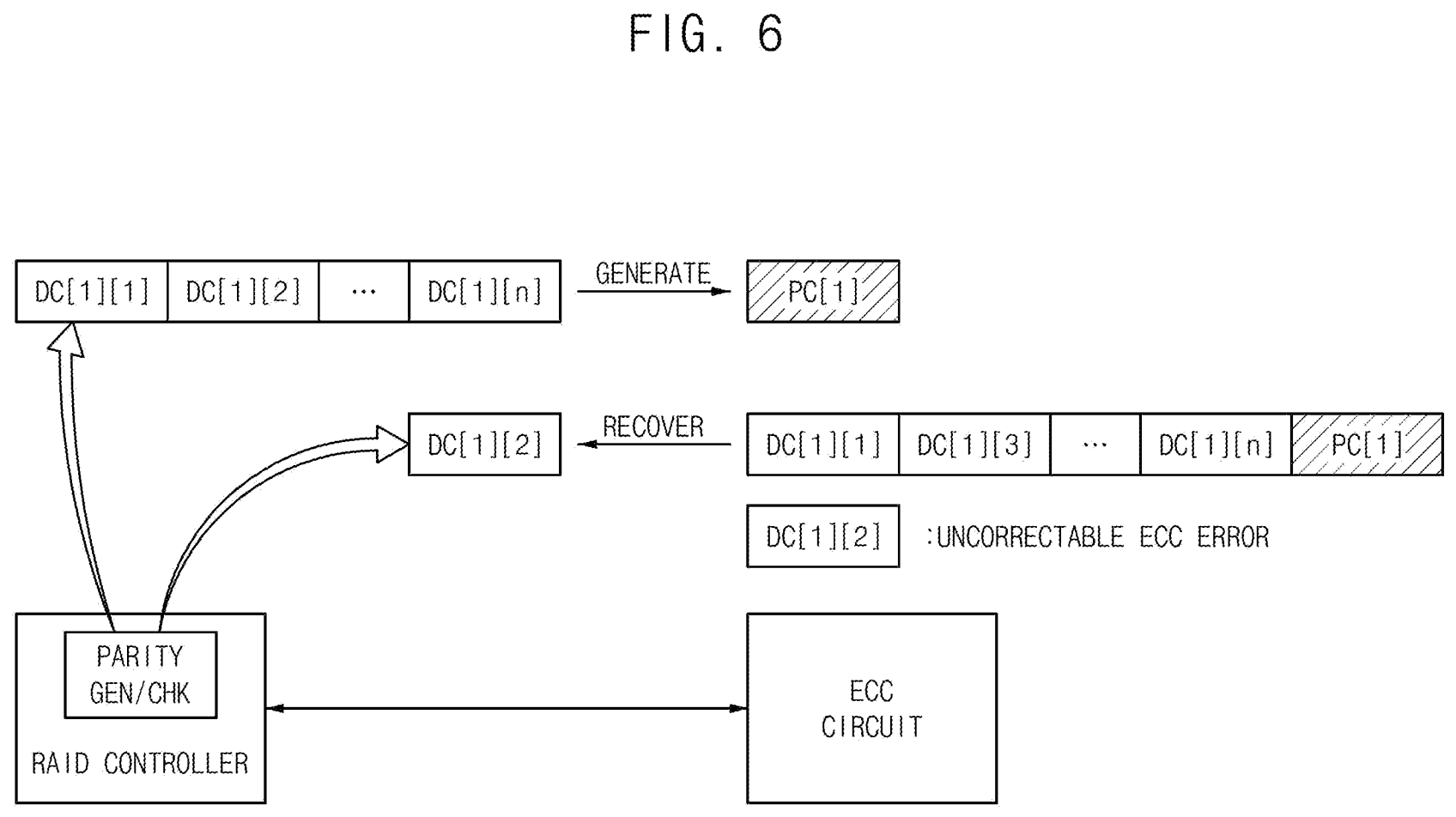

FIG. 6 is a diagram for describing a method of processing data using a redundant array of independent disks (RAID) scheme in a storage device according to example embodiments.

According to example embodiments, a RAID controller may include a parity generator/checker (GEN/CHK). The parity generator/checker may perform RAID encoding to generate parity chunks to be stored along with the data chunks. Furthermore, the parity generator/checker may check for errors in the data chunks by referring to the parity chunks.

When the data chunks and the parity chunks are stored in nonvolatile memory devices, an ECC circuit may perform ECC encoding. When the data chunks and parity chunks are read from the nonvolatile memory devices, in other words, when a direct read operation is performed, the ECC circuit may perform ECC decoding to correct ECC errors.

As an example, referring to FIG. 6, the first through n-th data chunks DC[1][1]~DC[1][n]) included in a first stripe may be stored in the nonvolatile memory devices. After the RAID controller receives the first through n-th data chunks DC[1][1]~DC[1][n] from the host device, the parity generator/checker determines the parity chunk PC[1] corresponding to the first stripe. In an example embodiment, data chunks included in each stripe may correspond to consecutive logical addresses of the host device. The first stripe including the first through n-th data chunks DC[1][1]~DC[1][n] and the parity chunk PC[1] is distributed and stored in the nonvolatile memory devices.

Additionally, the data chunks of the first stripe may be read and the data chunks having errors may be restored. After the first through n~th data chunks DC[1][1]~DC[1][n] are read from the nonvolatile memory devices, the ECC circuit may check and correct errors in the first through n-th data chunks DC[1][1]~DC[1][n]. For example, the ECC circuit may perform the ECC operations using RS codes (Reed-Solomon Codes), Hamming Codes, Bose-Chaudhuri-Hocquenghem Codes (BCH codes), and/or LDPC codes (Low Density Parity Codes) to check and correct ECC errors.

When a failure occurs in a memory block or a nonvolatile memory device storing a specific data chunk, the data chunk may not be read correctly. In this case, an error exceeding the correction capability of the ECC circuit may occur, and the ECC circuit may not be able to correct an error of the data chunk. Data chunks with uncorrectable errors can be understood as having "Uncorrectable" ECC errors. When data having an uncorrectable ECC error is read, the storage device may transmit a read fail response to the host device.

However, even if a read failure response is output, the RAID storage device may restore a data chunk having an uncorrectable ECC error by referring to the parity chunk.

For example, as shown in FIG. 6, when the second data chunk DC[1][2] has an uncorrectable ECC error, the RAID controller may restore or generate the second data chunk DC[1][2] based on the first data chunk (DC[1][1]), the third through n-th data chunks DC[1][3]~DC[1][n] and the parity chunk PC[1]). In other words, the RAID controller may restore the second data chunk DC[1][2] by performing an operation on the remainder of the data chunks and the parity chunk of the first stripe.

In an example embodiment, when the parity chunk PC[1] is generated by performing an exclusive OR (XOR) operation on the first through n-th data chunks DC[1][1]~DC[1][n], the second data chunk DC[1][2] may be restored by performing the XOR operation on the first data chunk DC[1][1], the third through n-th data chunks DC[1][3]~DC[1][n]) and the parity PC[1].

According to the operation of the RAID controller, the RAID storage device may output the first stripe including the first through n-th data chunks DC[1][1]~DC[1][n] to the host device. Accordingly, the RAID storage device may perform a RAID recovery to ensure high reliability of the stored data.

According to example embodiments, an indirect read operation using RAID decoding may be performed to equalize a read disturbance even when no uncorrectable error UCE occurs.

Figure 7:
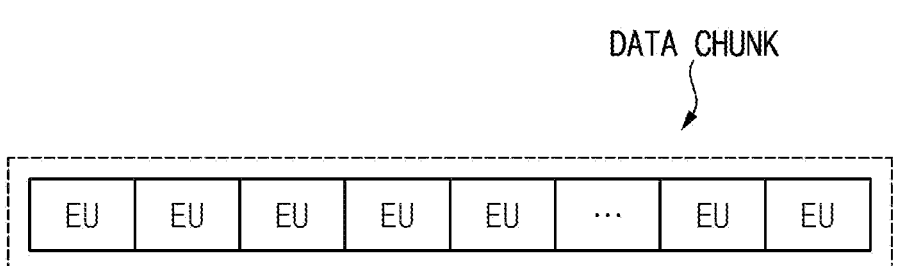
FIG. 7 is a diagram illustrating a constitution of a data chunk being processed in a storage device according to example embodiments.

FIG. 7 is a diagram illustrating a constitution of a data chunk being processed in a storage device according to example embodiments.

For example, storage devices may be classified into one of two types according to characteristics. In the first type of storage device, an ECC data unit having a data size for performing an ECC operation may be larger than a read data unit having a data size for performing a read operation. On the other hand, in the second type of storage device, the ECC data unit may be smaller than the read data unit.

For example, the first type of storage device may include a hard disk drive (HDD). In an HDD, a read operation may be performed in units of sectors. One sector may have a fairly small data size. Accordingly, an ECC data unit may have a larger data size than a read unit (e.g., a sector unit).

For example, the second type of storage device may include a solid state drive (SSD). In the SSD, a read operation may be performed in a page unit or a multi-page unit. To improve performance of a read operation, one page may have a relatively large data size. Accordingly, a read data unit (e.g., a page unit) may have a larger data size than an ECC data unit.

In the second type of storage device, as shown in FIG. 7, one data chunk may include a plurality of ECC data units EU. The ECC data units EU may be data having a data size of an ECC data unit for performing an ECC operation.

Example embodiments may be employed in the second type of storage device (e.g., SSD). However, example embodiments are not limited to SSDs, and may be employed in all storage devices of the second type to recover a data chunk including a plurality of ECC data units EU and having an uncorrectable ECC error.

Figure 8:
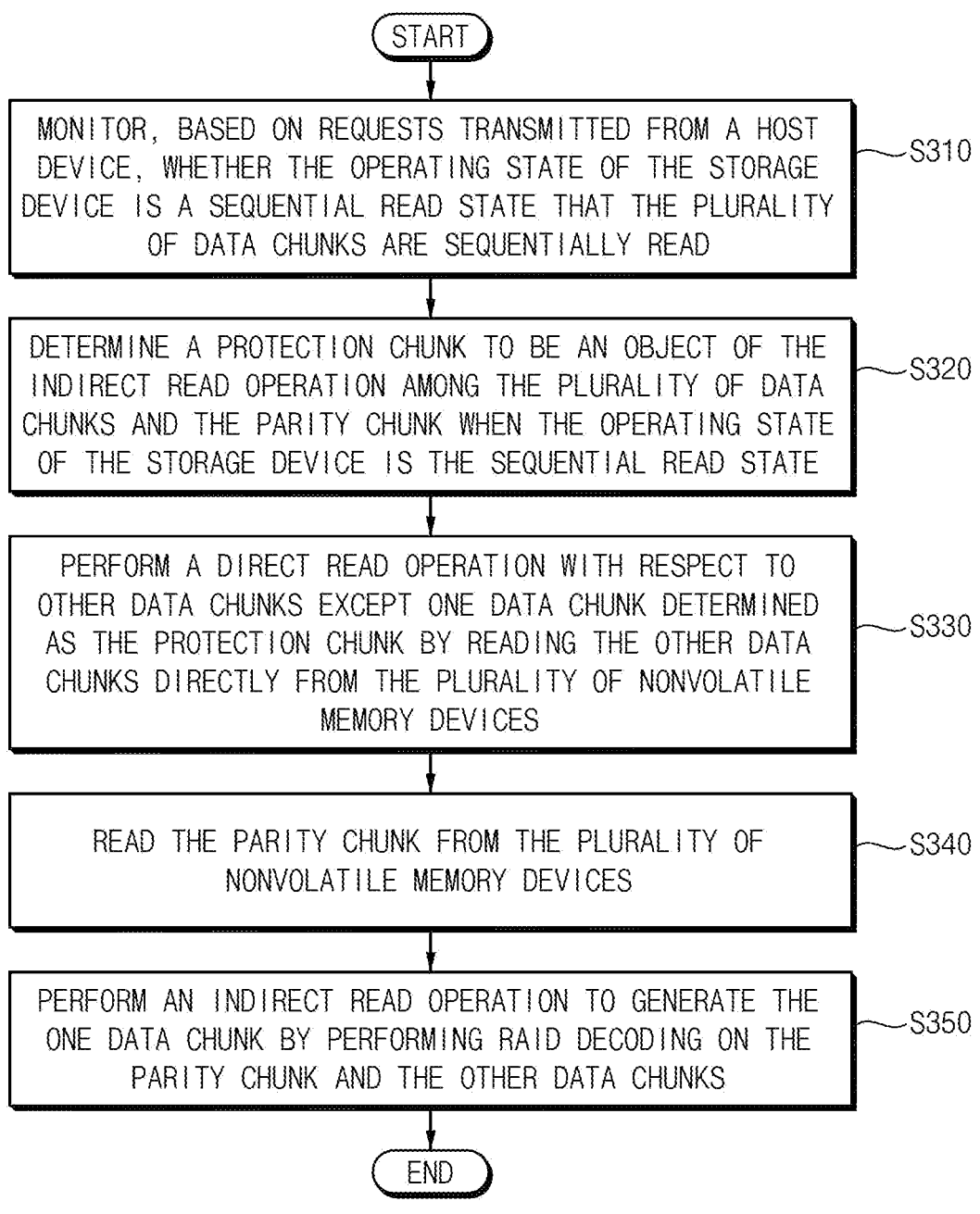
FIG. 8 is a flowchart illustrating an example embodiment of an indirect read operation in a method of operating a storage device according to example embodiments.

FIG. 8 is a flowchart illustrating an example embodiment of an indirect read operation in a method of operating a storage device according to example embodiments.

Referring to FIG. 8, based on requests transmitted from a host device, it may be monitored whether the operating state of the storage device is a sequential read state in which a plurality of data chunks are sequentially read (S310). In some example embodiments, as described with reference to FIG. 4, the operating state monitor 810 may generate the sequential read enable signal SREN indicating whether the present operating state of the storage device is the sequential read state based on the requests transmitted from the host device.

When the operating state of the storage device is the sequential read state, a protection chunk, which is to be an object of the indirect read operation, may be determined among the plurality of data chunks and the parity chunk (S320). The protection chunk may be determined such that the read disturbance to the plurality of memory blocks may become uniform. Example embodiments of determining the protection chunk will be described below with reference to FIGS. 10 through 13.

A direct read operation may be performed with respect to other data chunks except the one data chunk determined as the protection chunk by reading the other data chunks directly from the plurality of nonvolatile memory devices (S330). In other words, the data chunks, minus the protection chunk, are directly read. The other data chunks read by the direct read operation may be transmitted to the host device after errors are corrected by ECC decoding. The other data chunks may be stored in the storage controller for a next indirect read operation. For example, the other data chunks may remain stored in the memory 420 of FIG. 3 or a memory dedicated to the RAID controller.

The parity chunk may be read from the plurality of nonvolatile memory devices (S340). An indirect read operation may be performed to generate the one data chunk by performing RAID decoding on the parity chunk and the other data chunks (S350). In other words, the indirect read operation is performed to generate the one data chunk that corresponds to the protection chunk. Such an indirect read operation is performed to prevent read disturbance of the memory block in which the one data chunk is stored, and is distinguished from the RAID recovery performed when an uncorrectable error UCE occurs. Since the indirect read operation is performed by reading the parity chunk instead of reading the one data chunk, an increase in the number of read operations due to the indirect read operation does not occur.

Figure 9:
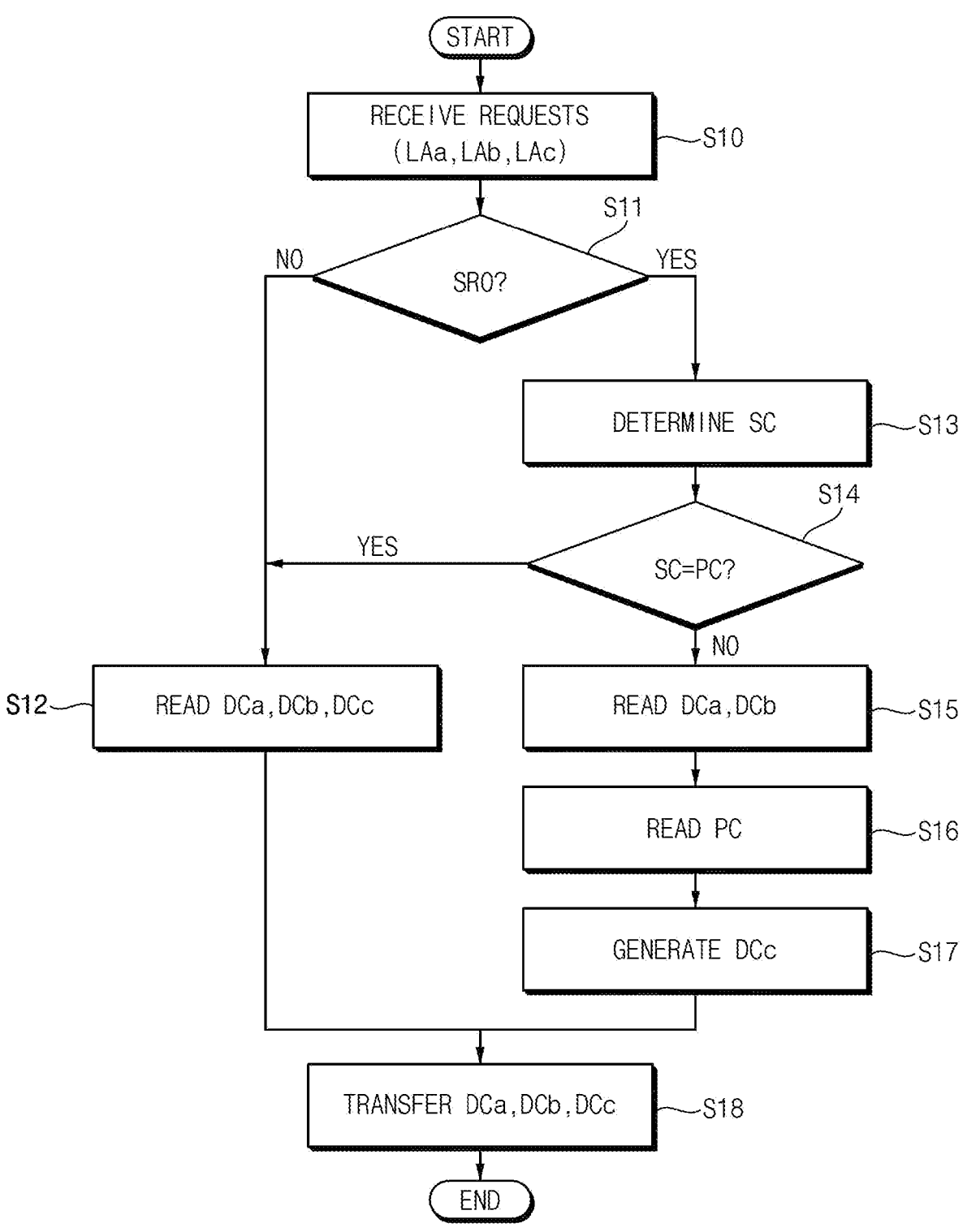
FIG. 9 is a flowchart illustrating a method of operating a storage device according to example embodiments.

FIG. 9 is a flowchart illustrating a method of operating a storage device according to example embodiments.

FIG. 9 illustrates an example embodiment in which the indirect read operation is performed when the operating state of the storage device is a sequential read state in which a plurality of data chunks included in each data stripe are sequentially read.

Figure 11:
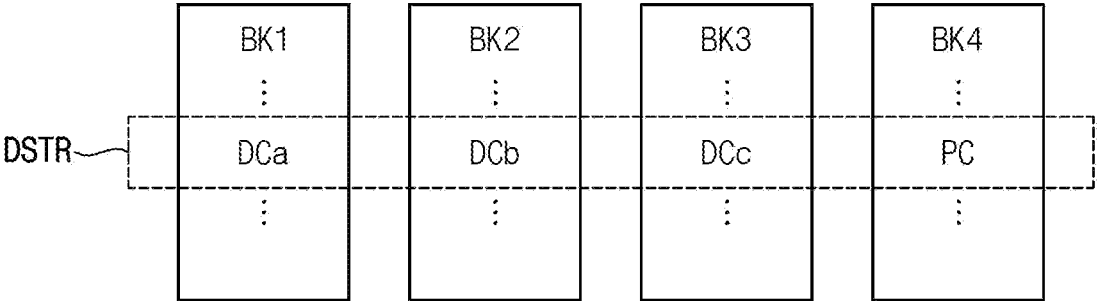

Referring to FIG. 9, the storage device may receive read requests including consecutive logical addresses LAa, LAb and LAc from the host device (S10). As shown in FIG. 11, the successive logical addresses LAa, LAb and LAc may respectively correspond to data chunks DCa, DCb and DCc included in one data stripe DSTR.

The storage controller may determine whether the current operating state of the storage device is a sequential read state SRO (S11).

When the current operating state is not the sequential read state SRO (S11: NO), the storage controller may perform the direct read operation to directly read the data chunks DCa, DCb and DCc corresponding to the logical addresses LAa, LAb and LAc from the nonvolatile memory devices (S12).

The storage controller may perform ECC decoding on the data chunks DCa, DCb and DCc to transfer error-corrected data chunks DCa DCb, and DCc to the host device (S18).

When the current operation state is the sequential read state SRO (S11: YES), the storage controller may determine a protection chunk SC (which is the target of the indirect read operation) among the data chunks DCa, DCb DCc and the parity chunk PC (S13).

When the protection chunk SC is the parity chunk PC (S14: YES), the storage controller may perform the direct read operation of directly reading the data chunks DCa, DCb, and DCc from the nonvolatile memory devices (S12). In this way, when the parity chunk PC is determined to be the protection chunk SC, the direct read operation may be performed on all of the plurality of data chunks included in each data stripe.

When the protection chunk SC is not a parity chunk PC, in other words, when the protection chunk SC is a data chunk (S14: NO), the storage controller may perform an indirect read operation. FIG. 9 shows an example in which the protection chunk SC is the one data chunk DCc.

In this case, the storage controller may perform the direct read operation of directly reading data chunks DCa and DCb other than the protection chunk SC=DCc from the nonvolatile memory devices (S15). In other words, the storage controller may directly read the data chunks DCa and DCb but not the data chunk DCc. Additionally, the storage controller may read the parity chunk PC from the nonvolatile memory devices (S16). Afterwards, the storage controller may correct the error by performing ECC decoding on the other data chunks DCa and DCb and the parity chunk PC read by the direct read operation.

The storage controller may perform the indirect read operation of generating one data chunk DCc by performing RAID decoding based on the other data chunks DCa and DCb and the parity chunk PC (S17).

As such, when the one data chunk DCc among the plurality of data chunks DCa, DCb, DCc included in each data stripe is determined as the protection chunk SC, the direct read operation may be performed with respect to the other data chunks DCa and DCb, and the indirect read operation may be performed with respect to the one data chunk DCc determined as the protection chunk SC. In addition, ECC decoding may be performed with respect to the other data chunks DCa and DCb except the one data chunk DCc, and ECC decoding may not be performed on the data chunk DCc determined as the protection chunk SC.

The storage controller may transfer the error-corrected data chunks DCa and DCb by ECC decoding and the data chunk DCc generated by the indirect read operation to the host device (S18).

Hereinafter, example embodiments of determining a protection chunk will be described with reference to FIGS. 10 through 13, to uniform the read disturbance of a plurality of memory blocks in which a plurality of data chunks and parity chunks included in each data stripe are distributed and stored.

Figure 10:
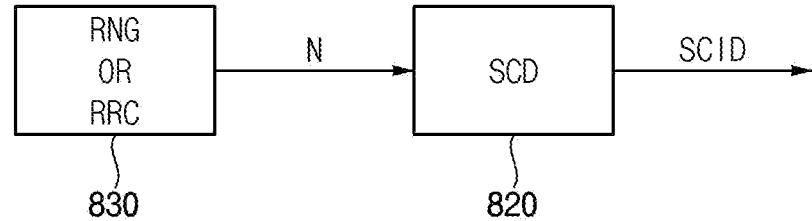
FIG. 10 is a diagram illustrating an example embodiment of determining a protection chunk in a method of operating a storage device according to example embodiments.

FIG. 10 is a diagram illustrating an example embodiment of determining a protection chunk in a method of operating a storage device according to example embodiments.

Referring to FIG. 10, the protection chunk determiner 820 of FIG. 4 may determine a protection chunk based on a random number or in a round robin method. A number generator 830 corresponding to a random number generator RNG or a round robin counter RRC shown in FIG. 10 may provide a number N representing the protected chunk. For example, when each data stripe includes m data chunks and one parity chunk, the number generator 830 may provide a number N corresponding to one of 1 to m+1.

In an example embodiment, the number generator 830 corresponding to the random number generator RNG may generate a random number N, and the protection chunk determiner 820 may determine a data chunk or a parity chunk corresponding to the random number N as the protection chunk. According to example embodiments, the chunk determiner 820 may generate a protection chunk identifier SCID indicating the determined protection chunk based on the random number N.

In an example embodiment, the number generator 830 corresponding to the round robin counter RRC may provide the number N in a round robin manner, and the protection chunk determiner 820 may determine, as the protection chunk, the plurality of data chunks and parity data included in each data stripe sequentially one by one in a round robin manner.

FIGS. 11 and 12 are diagrams illustrating an example embodiment of determining a protection chunk in a method of operating a storage device according to example embodiments.

For example, as shown in FIG. 11, each data stripe DSTR may include three data chunks, in other words, a first data chunk DCa, a second data chunk DCb and a third data chunk DCc, and a parity chunk PC. The first data chunk DCa, the second data chunk DCb, the third data chunk DCc, and the parity chunk PC may be distributed and stored in first through fourth memory blocks BK1-BK4. In an example embodiment, the first through fourth memory blocks BK1~BK4 for distributive storage may be included in different nonvolatile memory devices (e.g., semiconductor chips), and the different nonvolatile memory devices may be connected to the storage controller through different channels.

FIG. 12 illustrates an example of determining a protection chunk SC in a round robin method for the data stripe DSTR of FIG. 11.

In a first read (NR=1), the parity chunk PC may be determined as the protection chunk SC, and the remaining chunks DCa, DCb and DCc may be determined as non-protection chunks NSC. In this case, as described above, the direct read operation may be performed on all of the data chunks DCa, DCb and DCc corresponding to the non-protection chunks NSC.

In a second read (NR=2), the third data chunk DCc may be determined as the protection chunk SC, and the remaining chunks DCa, DCb and PC may be determined as non-protection chunks NSC. In this case, as described above, the direct read operation may be performed on the data chunks DCa and DCb corresponding to the non-protection chunks NSC, and the indirect read operation may be performed on the data chunk DCc corresponding to the protection chunk SC.

In a third read (NR=3), the second data chunk DCb may be determined as the protection chunk SC, and the remaining chunks DCa, DCc and PC may be determined as non-protection chunks NSC. In this case, as described above, the direct read operation may be performed on the data chunks DCa and DCc corresponding to the non-protection chunks NSC, and the indirect read operation may be performed on the data chunk DCb corresponding to the protection chunk SC.

In a fourth read (NR=4), the first data chunk DCa may be determined as the protection chunk SC, and the remaining chunks DCb, DCc and PC may be determined as non-protection chunks NSC. In this case, as described above, the direct read operation may be performed on the data chunks DCb and DCc corresponding to the non-protection chunks NSC, and an indirect read operation may be performed on the data chunk DCa corresponding to the protection chunk SC.

In a fifth read (NR=5), the parity chunk PC may be determined as the protection chunk SC, and the remaining chunks DCa, DCb and DCe may be determined as non-protection chunks NSC. In this case, as described above, the direct read operation may be performed on the data chunks DCa, DCb and DCc corresponding to the non-protection chunks NSC, and an indirect read operation may be performed on the parity chunk PC corresponding to the protection chunk SC.

Thereafter, the first to fourth reads (NR=1 to 4) may be repeatedly performed again from the fifth read (NR=5).

The first to fourth reads (NR=1 to 4) shown in FIG. 12 may be repeatedly performed with respect to the same data stripe, or may be repeatedly performed with respect to different data stripes stored together in the first to fourth memory blocks BK1 to BK4 of FIG. 11.

FIG. 13 is a diagram illustrating metadata to determining a protection chunk in a method of operating a storage device according to example embodiments.

FIG. 13 illustrates a portion of metadata managed in a storage device. For example, the metadata may include values C1~C4 of a read count RC and values N1~N4 of an error bit count NEB corresponding to the block addresses BA1~BA4, respectively.

In an example embodiment, the storage controller may monitor the read count RC indicating the number of read operations performed on each of the plurality of memory blocks in which the plurality of data chunks and parity chunks included in each data stripe are distributed and stored. The storage controller may determine a chunk stored in a memory block having a maximum read count value among the plurality of data chunks and the parity chunk as a protection chunk to be an object of the above-described indirect read operation. Accordingly, a difference between the values of the read count RC corresponding to memory blocks may be reduced, and as a result, the read disturbance affecting the memory blocks storing the data stripe may be uniform, and the influence of the read disturbance may be prevented from being concentrated on a particular portion of the memory blocks.

In an example embodiment, the storage controller may monitor the respective error bit count NEB of a plurality of memory blocks in which a plurality of data chunks and parity chunks included in each data stripe are distributed and stored. The storage controller may determine a chunk stored in a memory block having a maximum value of the error bit count NEB among the plurality of data chunks and the parity chunk as a protection chunk to be an object of the above-described indirect read operation. In this case, the frequency of uncorrectable errors UCE may be reduced by replacing the direct read operation for a memory block with a high possibility of occurrence of uncorrectable errors UCE with the indirect read operation.

Figure 14:
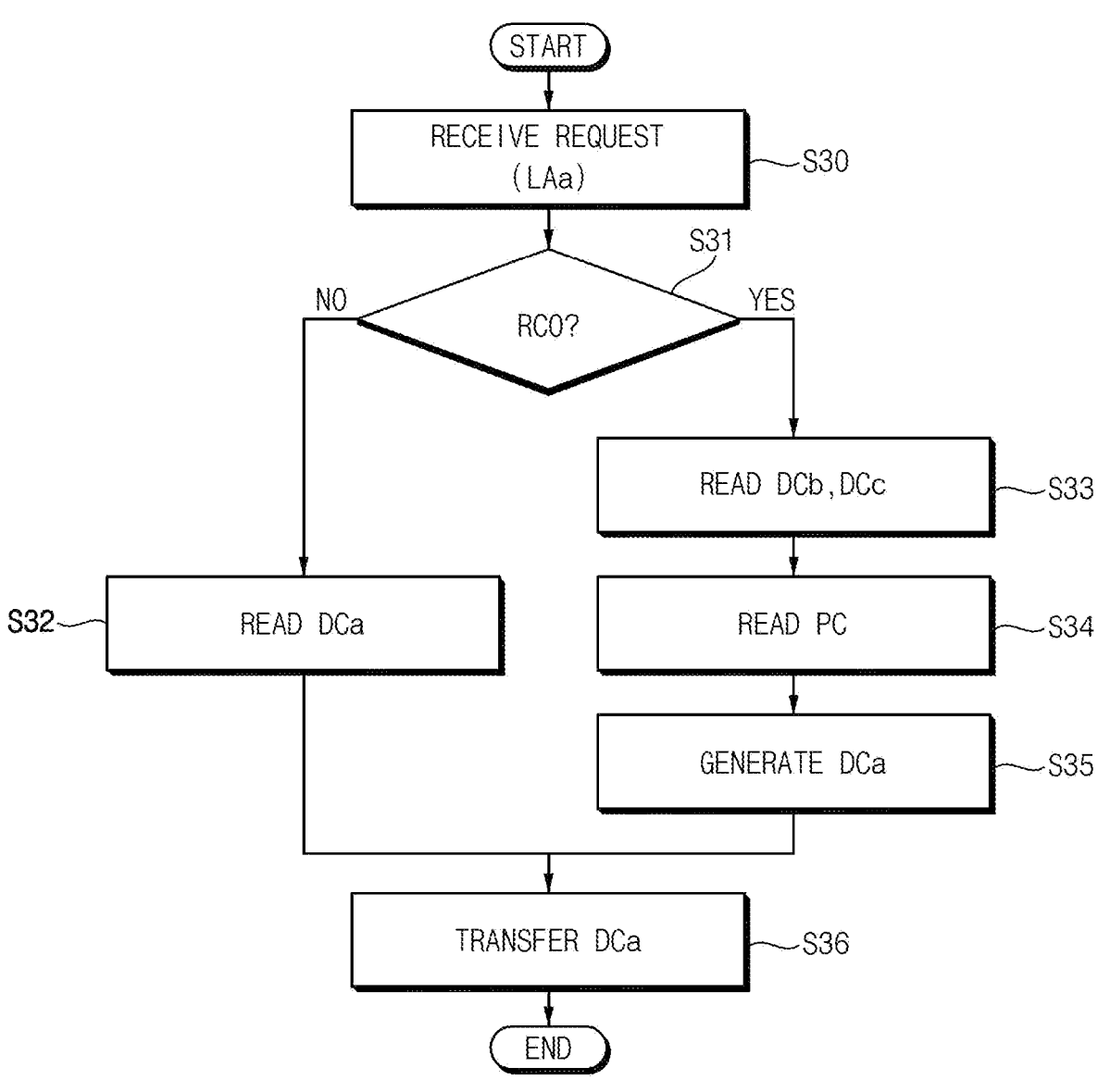
FIG. 14 is a flowchart illustrating a method of operating a storage device according to example embodiments.

FIG. 14 is a flow chart illustrating a method of operating a storage device according to example embodiments.

FIG. 14 illustrates an example embodiment in which an indirect read operation is performed when the storage device is in a reclaim operation state in which data of a memory block in which a target data chunk is stored is moved to and stored in another erased memory block. The reclaim operation is a conventional technique in which data of a memory block whose read count value RC exceeds a threshold value is moved to an erased free memory block.

Referring to FIG. 14, the storage device may receive a read request including a logical address LAa from the host device (S30). For example, the logical addresses LAa, LAb, and LAc may respectively correspond to data chunks DCa, DCb and DCc included in one data stripe DSTR, as shown in FIG. 11.

The storage controller may determine whether the present operating state of the storage device is a reclaim operating state RCO in which the data of the memory block in which the target data chunk DCa corresponding to the logical address LAa is stored is moved to another erased memory block (S31).

When the current operating state is not the reclaim operating state RCO (S31: NO), the storage controller may perform the direct read operation of directly reading the target data chunk DCa corresponding to the logical address LAa from the nonvolatile memory devices (S32).

The storage controller may perform ECC decoding on the target data chunk DCa to transfer the error-corrected data chunk DCa to the host device (S36).

When the present operating state is the reclaim operating state RCO (S31: YES), the storage controller may perform the indirect read operation. The storage controller may perform the direct read operation of directly reading the other data chunks DCb and DCc except the target data chunk DCa from the nonvolatile memory devices (S33). Additionally, the storage controller may read the parity chunk PC from the nonvolatile memory devices (S34). Afterwards, the storage controller may correct the error by performing ECC decoding on the other data chunks DCa and DCb and the parity chunk PC read by the direct read operation.

The storage controller may perform the indirect read operation of generating the target data chunk DCa by performing RAID decoding based on the other data chunks DCb and DCc and the parity chunk PC (S35).

As such, when the direct read operation on the target data chunk DCa cannot be performed in the reclaim operation state, the target data chunk DCa may be generated by the indirect read operation and provided to the host device. In general, a reclaim operation takes a very long time because it moves and stores all data in a memory block to another memory block. Using the indirect read operation according to an embodiment the present disclosure, an increase in read latency due to a reclaim operation is prevented and performance of a storage device and a system including the same is improved.

Figure 15:
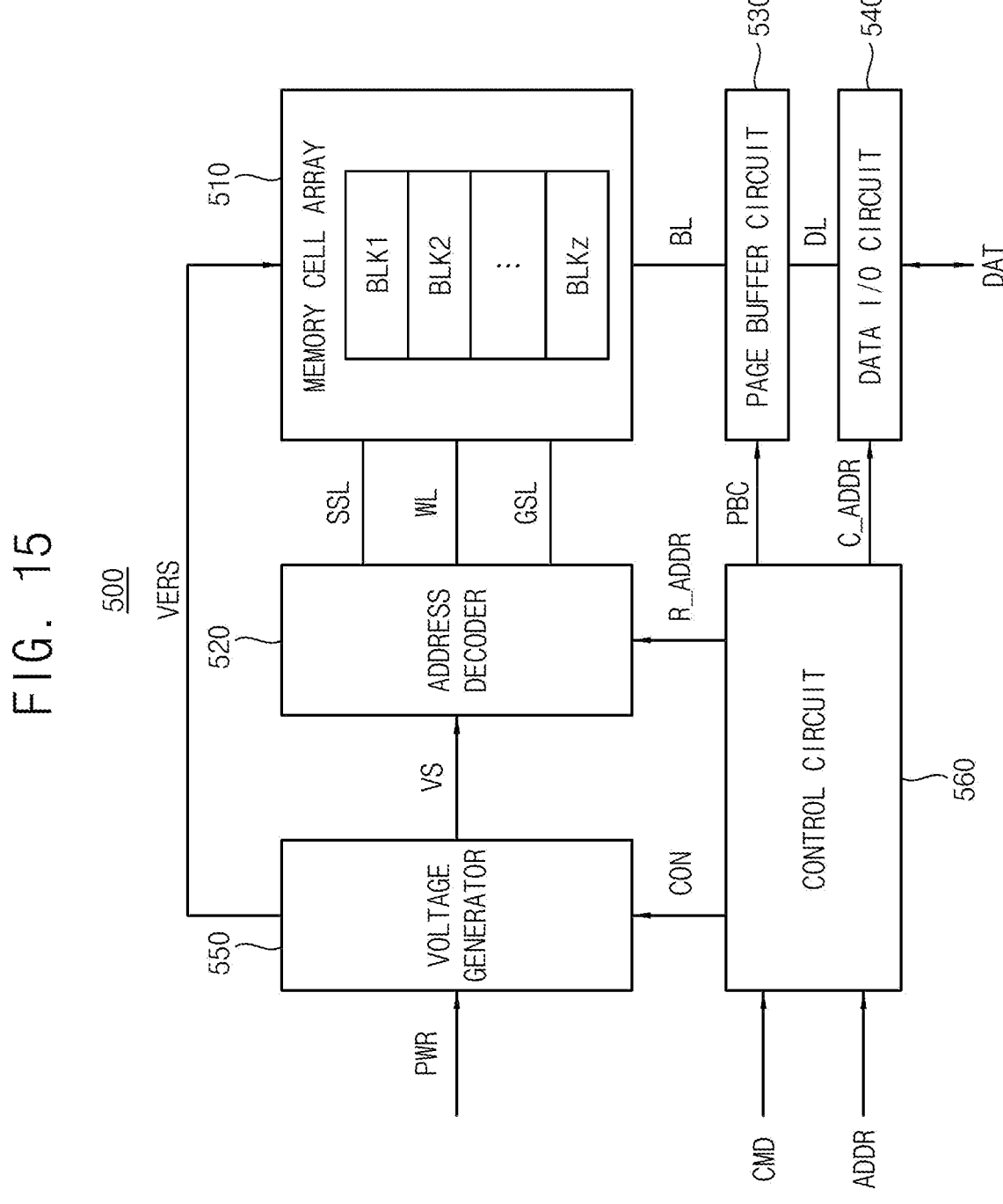
FIG. 15 is a block diagram illustrating a nonvolatile memory device included in a storage device according to example embodiments.

FIG. 15 is a block diagram illustrating a nonvolatile memory device included in a storage device according to example embodiments.

Referring to FIG. 15, a nonvolatile memory 500 includes a memory cell array 510, an address decoder 520, a page buffer circuit 530, a data I/O circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some example embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 17.

The control circuit 560 receives a command CMD and an address ADDR from an outside (e.g., from the storage controller 310 in FIG. 2), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification VERS voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520. The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed (e.g., read) from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory is described based on a NAND flash memory, example embodiments are not limited thereto, and the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 16:
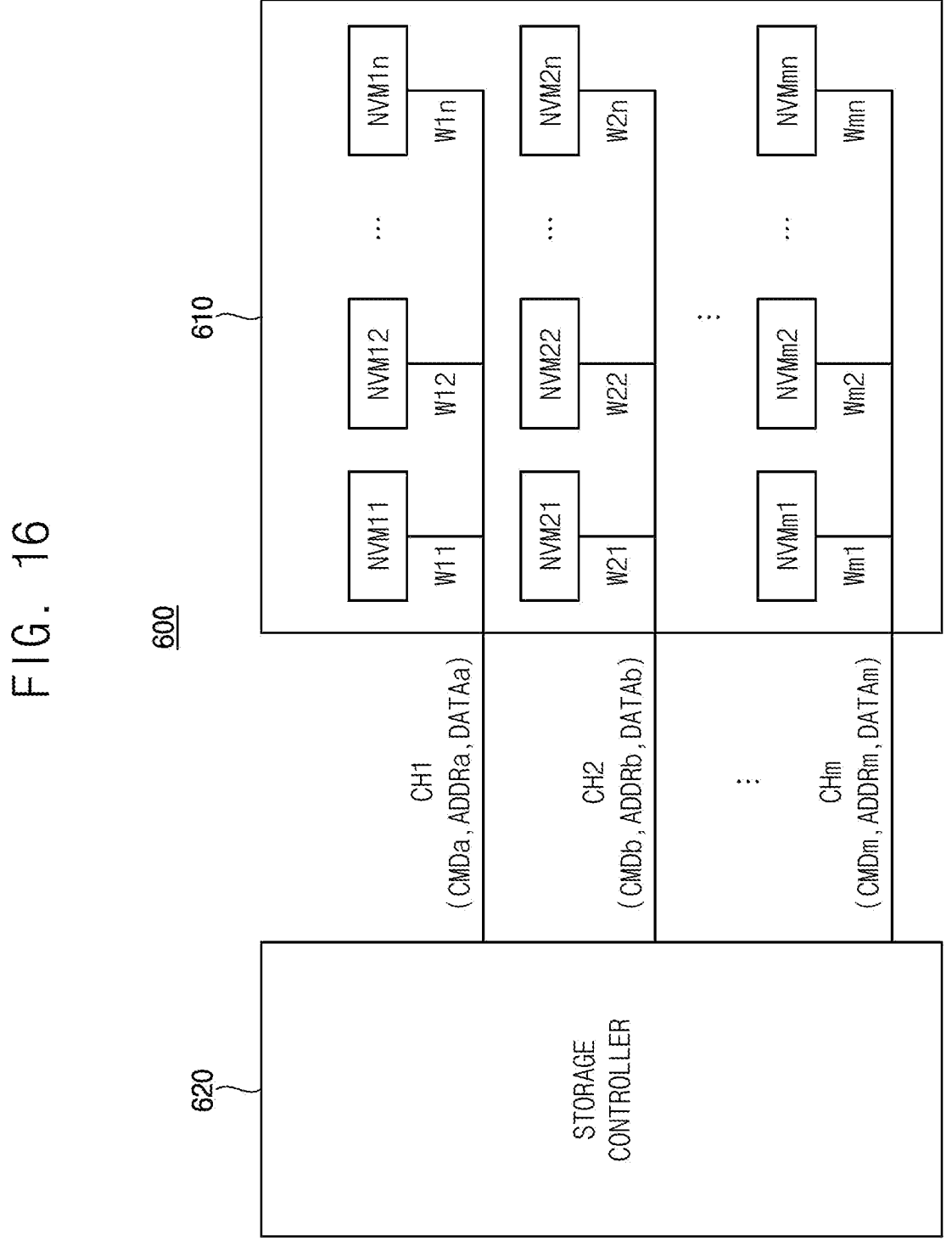
FIG. 16 is a block diagram illustrating a storage device according to example embodiments.

FIG. 16 is a block diagram illustrating a storage device according to example embodiments.

Referring to FIG. 16, a storage device 600 may include a memory device 610 and a storage controller 620. The storage device 600 may support a plurality of channels CH1, CH2, . . . , CHm, and the memory device 610 may be connected to the storage controller 620 through the plurality of channels CH1 to CHm. For example, the storage device 600 may be implemented as a storage device, such as a universal flash storage (UFS), a solid state drive (SSD), or the like.

The memory device 610 may include a plurality of nonvolatile memories NVM11, NVM12, . . . , NVM1n, NVM21, NVM22, . . . , NVM2n, NVMm1, NVMm2, . . . , NVMmn. For example, the nonvolatile memories NVM11 to NVMmn may correspond to the nonvolatile memory device 320a, 320b and 320c in FIG. 2. Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the storage controller 620. For example, each of the nonvolatile memories NVM11 to NVMmn may be implemented as a chip or a die, but example embodiments are not limited thereto.

The storage controller 620 may transmit and receive signals to and from the memory device 610 through the plurality of channels CH1 to CHm. For example, the storage controller 620 may correspond to the storage controller 310 in FIG. 2. For example, the storage controller 620 may transmit commands CMDa, CMDb, . . . , CMDm, addresses ADDRa, ADDRb, ADDRm and data DATAa, DATAb, . . . , DATAm to the memory device 610 through the channels CH1 to CHm, or may receive the data DATAa to DATAm from the memory device 610 through the channels CH1 to CHm.

The storage controller 620 may select one of the nonvolatile memories NVM11 to NVMmn, which is connected to each of the channels CH1 to CHm, using a corresponding one of the channels CH1 to CHm, and may transmit and receive signals to and from the selected nonvolatile memory. For example, the storage controller 620 may select the nonvolatile memory NVM11 from among the nonvolatile memories NVM11 to NVM1n connected to the first channel CH1. The storage controller 620 may transmit the command CMDa, the address ADDRa and the data DATAa to the selected nonvolatile memory NVM11 through the first channel CH1 or may receive the data DATAa from the selected nonvolatile memory NVM11 through the first channel CH1. As another example, the storage controller 620 may select the nonvolatile memory NVM21 from among the nonvolatile memories NVM21 to NVM2n connected to the second channel CH2. The storage controller 620 may transmit the command CMDb, the address ADDRb and the data DATAb to the selected nonvolatile memory NVM21 through the second channel CH2 or may receive the data DATAb from the selected nonvolatile memory NVM21 through the second channel CH2.

The storage controller 620 may transmit and receive signals to and from the memory device 610 in parallel through different channels. For example, the storage controller 620 may transmit the command CMDb to the memory device 610 through the second channel CH2 while transmitting the command CMDa to the memory device 610 through the first channel CH1. For example, the storage controller 620 may receive the data DATAb from the memory device 610 through the second channel CH2 while receiving the data DATAa from the memory device 610 through the first channel CH1.

The storage controller 620 may control overall operations of the memory device 610. The storage controller 620 may transmit a signal to the channels CH1 to CHm and may control each of the nonvolatile memories NVM11 to NVMmn connected to the channels CH1 to CHm. For example, the storage controller 620 may transmit the command CMDa and the address ADDRa to the first channel CH1 and may control one selected from among the nonvolatile memories NVM11 to NVM1n. Similarly, the storage controller 620 may transmit the command CMDb and the address ADDRb to the second channel CH2 and may control one selected from among the nonvolatile memories NVM21 to NVM2n.

Each of the nonvolatile memories NVM11 to NVMmn may operate under the control of the storage controller 620. For example, the nonvolatile memory NVM11 may program the data DATAa based on the command CMDa, the address ADDRa and the data DATAa provided from the storage controller 620 through the first channel CH1. For example, the nonvolatile memory NVM21 may read the data DATAb based on the command CMDb and the address ADDRb provided from the storage controller 620 through the second channel CH2 and may transmit the read data DATAb to the storage controller 620 through the second channel CH2.

Although FIG. 16 illustrates an example where the memory device 610 communicates with the storage controller 620 through m channels and includes n nonvolatile memories corresponding to each of the channels, example embodiments are not limited thereto and the number of channels and the number of nonvolatile memories connected to one channel may be variously changed.

Figure 17:
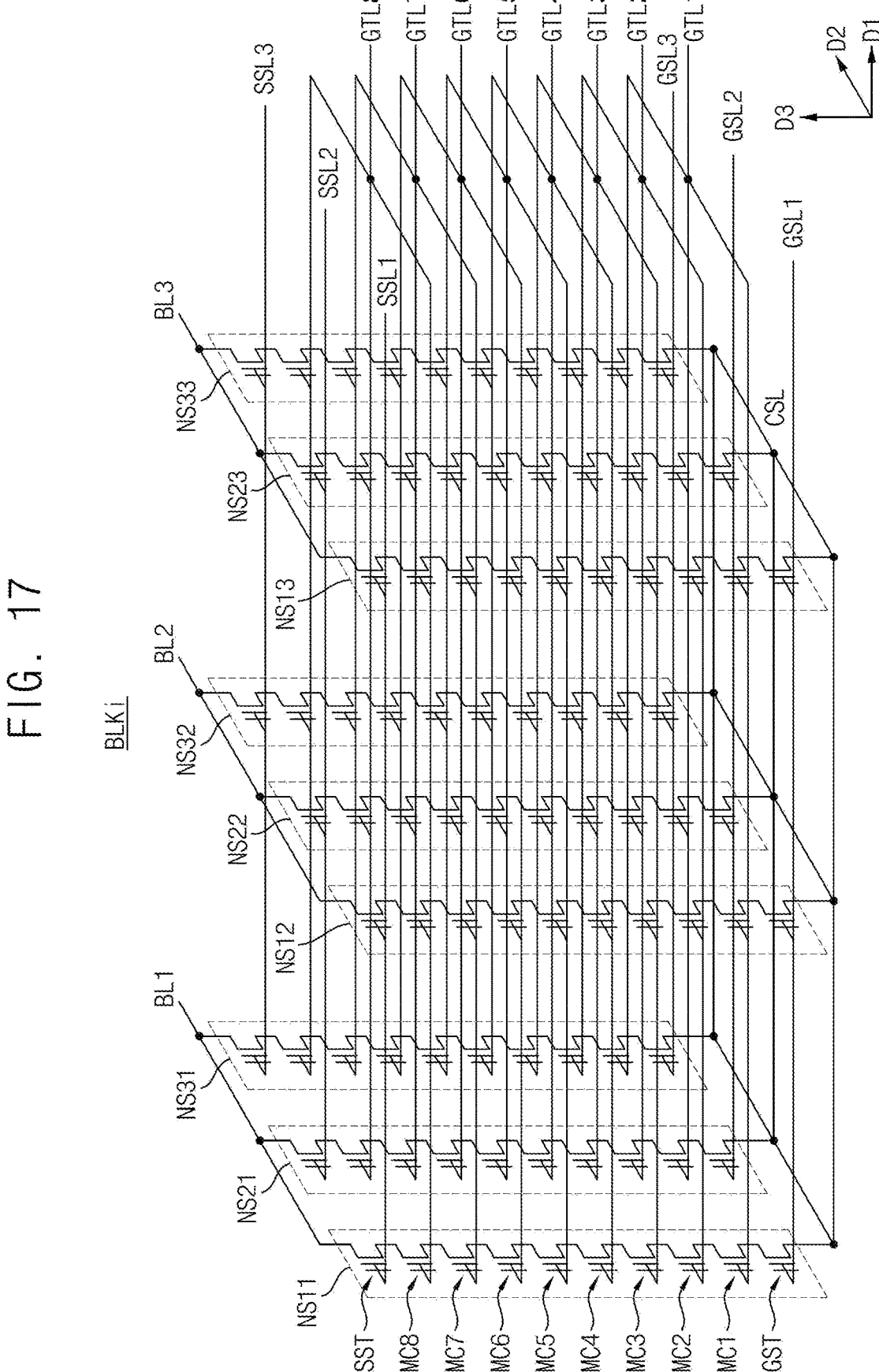
FIG. 17 is a circuit diagram illustrating an equivalent circuit of a memory block of a nonvolatile memory device included in a storage device according to example embodiments.

FIG. 17 is a circuit diagram illustrating an equivalent circuit of a memory block of a nonvolatile memory device included in a storage device according to example embodiments.

Referring to FIG. 17, each memory block BLKi included in a memory cell array 510 in FIG. 15 may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate.

The memory block BLKi may include NAND strings NS11, NS12, NS13, NS21, NS22, NS23, NS31, NS32 and NS33 coupled between bitlines BL1, BL2, and BL3 and a common source line CSL. Each of the NAND strings NS11 to NS33 may include a string selection transistor SST, a memory cells MC1, MC2, MC3, MC4, MC5, MC6, MC7 and MC8, and a ground selection transistor GST. In FIG. 17, each of the NAND strings NS11 to NS33 is illustrated to include eight memory cells MC1 to MC8. However, embodiments are not limited thereto, and each of the NAND strings NS11 to NS33 may include various numbers of memory cells.

Each string selection transistor SST may be connected to a corresponding string selection line (one of SSL1, SSL2 and SSL3). The memory cells MC1 to MC8 may be connected to corresponding gate lines GTL1, GTL2, GTL3, GTL4, GTL5, GTL6, GTL7 and GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1, GSL2 and GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. In FIG. 17, the memory block BLKi is illustrated as being coupled to eight gate lines GTL1 to GTL8 and three bitlines BL1 to BL3. However, example embodiments are not limited thereto, and each memory block in the memory cell array 510 may be coupled to various numbers of wordlines and various numbers of bitlines.

Figure 18:
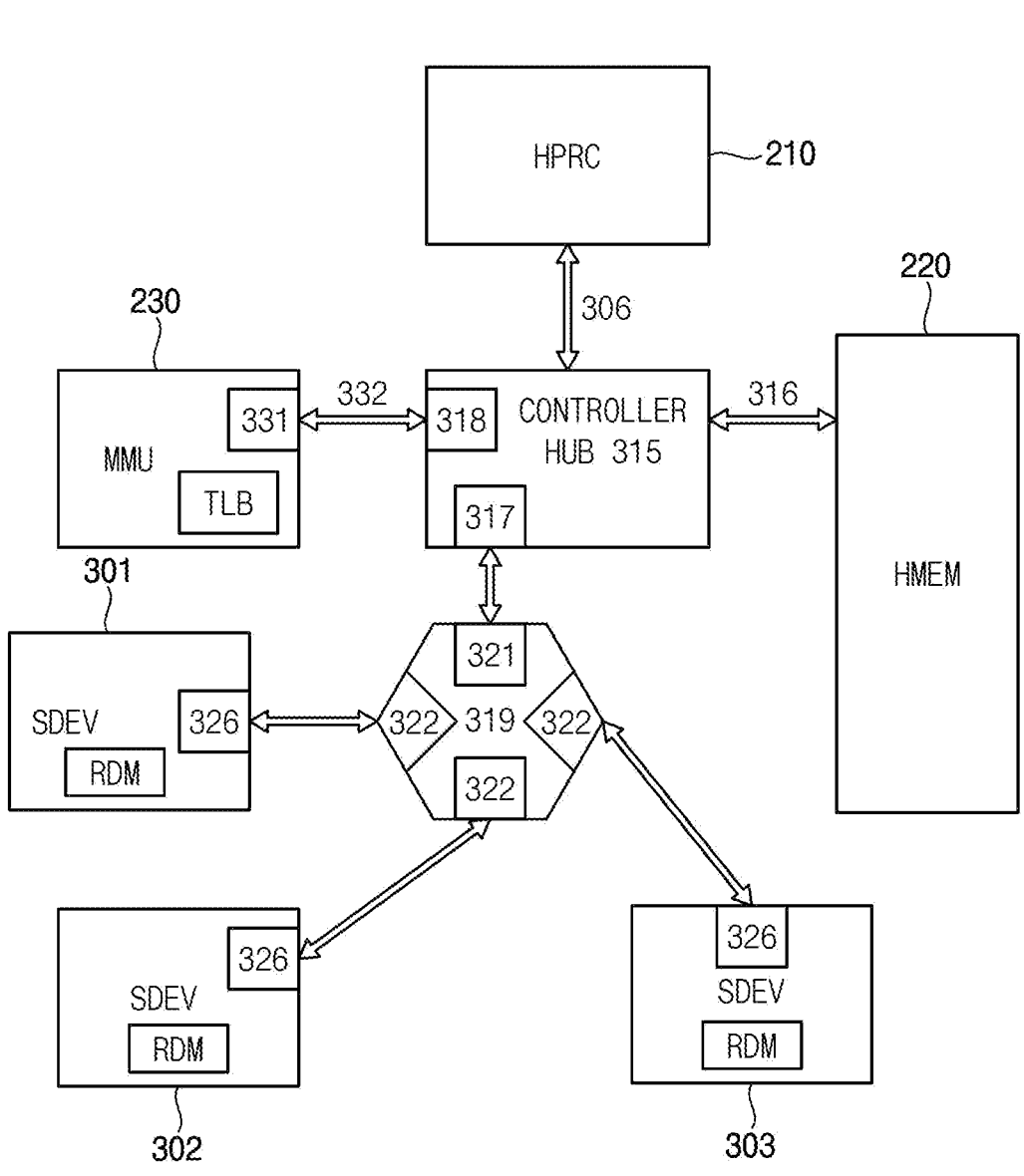
FIG. 18 is a block diagram illustrating an example embodiment of an interconnect architecture of a storage system according to example embodiments.

FIG. 18 is a block diagram illustrating an example embodiment of an interconnect architecture of a storage system according to example embodiments.

Referring to FIG. 18, an example embodiment of a design composed of point-to-point links that interconnect a set of components is illustrated. A system 102 includes host processor HPRC 210, a host memory device (or a system memory) HMEM 220 and a memory management unit MMU 230 coupled to a controller hub 315. The host processor 210 includes any processing element, such as a microprocessor, a host processor, an embedded processor, a co-processor, or other processor. The host processor 210 is coupled to the controller bub 315 through a front-side bus (FSB) 306. In one example embodiment, the FSB 306 is a serial point-to-point interconnect. In another example embodiment, the FSB 306 includes a serial, differential interconnect architecture that is compliant with a different interconnect standard.

The system memory 220 includes any memory device, such as random access memory (RAM), nonvolatile (NV) memory, solid state memory, or other memory accessible by devices in the system 300. The system memory 220 is coupled to the controller hub 315 through a memory interface 316. Examples of a memory interface include a double-data rate (DDR) memory interface, a dual-channel DDR memory interface, and a dynamic RAM (DRAM) memory interface.

In one example embodiment, the controller hub 315 is a root hub, root complex, or root controller in a Peripheral Component Interconnect Express (PCIe or PCIE) interconnection hierarchy. Examples of the controller hub 315 include a chipset, a memory controller hub (MCH), a northbridge, an interconnect controller hub (ICH) a southbridge, and a root controller/hub. Often the term chipset refers to two physically separate controller hubs, e.g. a memory controller hub (MCH) coupled to an interconnect controller hub (ICH). Note that current systems often include the MCH integrated with the host processor 210, while the controller hub 315 is used to communicate with I/O devices, in a similar manner as described below. In some example embodiments, peer-to-peer routing is optionally supported through the root complex or the controller hub 315.

Here, the controller hub 315 is coupled to a switch 319 through a serial link. Input/output modules 317 and 321, which may also be referred to as interfaces/ports 317 and 321, include/implement a layered protocol stack to provide communication between the controller hub 315 and the switch 319. In one example embodiment, multiple devices are capable of being coupled to the switch 319. The switch 319 may be referred to as a bridge.

The switch 319 routes packets/messages from storage devices 301, 302 and 303 upstream, e.g., up a hierarchy towards a root complex, to the controller hub 315 and downstream, e.g., down a hierarchy away from a root controller, from the processor 210 or the system memory 220 to the storage devices 301, 302 and 303. I/O modules 322 and 326 are used to implement a layered protocol stack to communicate between the switch 319 and the storage devices 301, 302 and 303. The switch 319, in one example embodiment, is referred to as a logical assembly of multiple virtual PCI-to-PCI bridge devices. The storage devices 301, 302 and 303 include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. The storage devices 301, 302 and 303 may additionally include a PCIe to PCI/PCI-X bridge to support legacy or other version PCI devices. Endpoint devices in PCIe are often classified as legacy, PCIe, or root complex integrated endpoints.

The memory management unit 230 is also coupled to the controller hub 315 through a serial link 332. I/O modules 331 and 318 are used to implement a layered protocol stack to communicate between the memory management unit 230 and the controller hub 315.

The memory management unit 230 may include a translation look aside buffer (TLB) configured to store the address mapping information referenced recently and/or frequently.

As described above, the storage devices 301, 302 and 303 may include read disturbance managers RDM, respectively, to uniformalize the read disturbance of the storage devices 301, 302 and 303.

Figure 19:
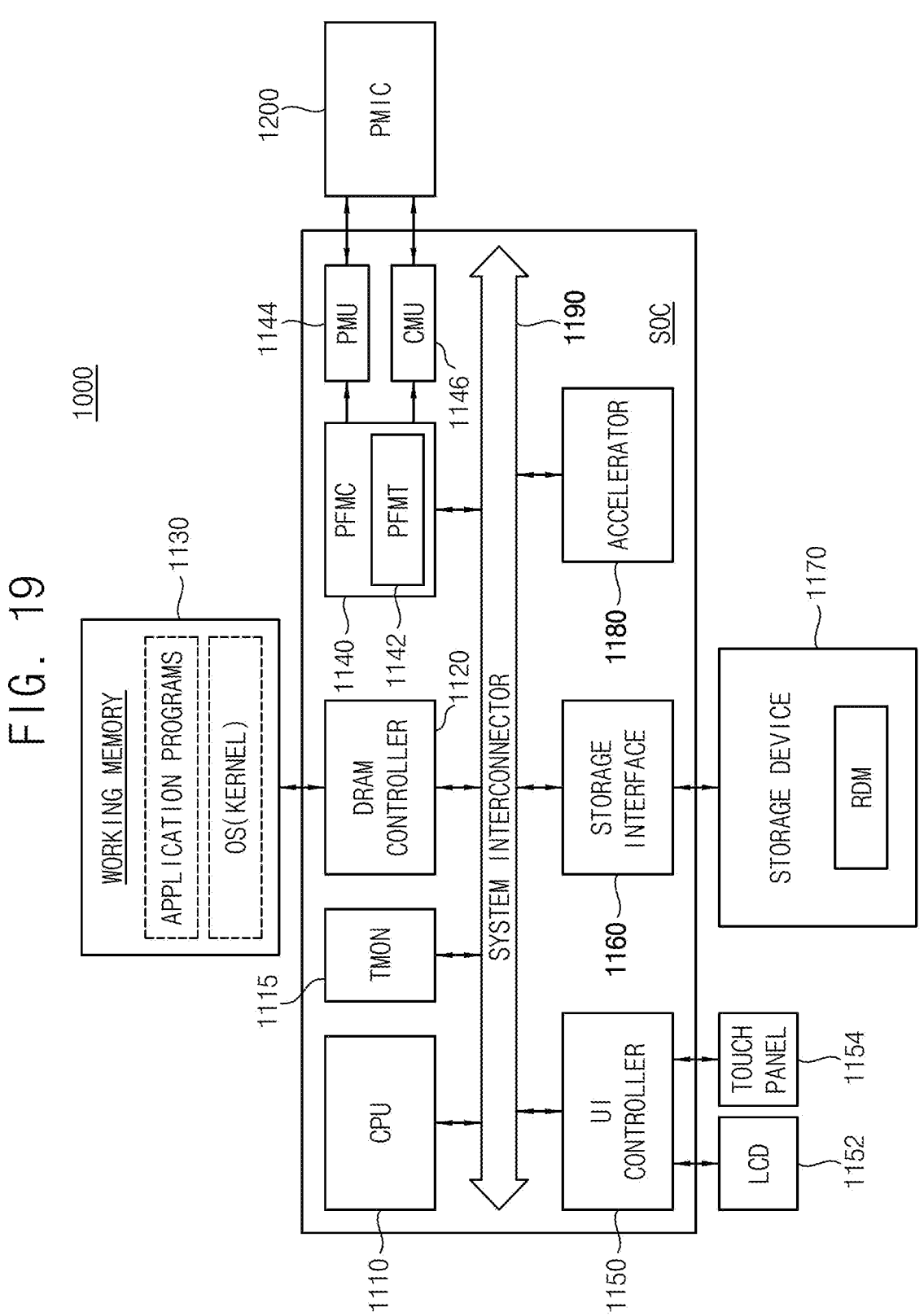
FIG. 19 is a block diagram illustrating a computing system according to example embodiments.

FIG. 19 is a block diagram illustrating a computing system according to example embodiments.

Referring to FIG. 19, a multi-core system 1000 may include a system on chip (SoC), a working memory 1130, a display device (LCD) 1152, a touch panel 1154, a storage device 1170, a power management integrated circuit (PMIC) 1200, etc. The SoC may include a central processing unit (CPU) 1110, a task monitor circuit TMON 1115, a DRAM controller 1120, a performance controller 1140, a user interface controller (UI controller) 1150, a storage interface 1160, an accelerator 1180, a power management unit (PMU) 1144, a clock management unit (CMU) 1146, etc. It will be understood that components of the multi-core system 1000 are not limited to the components shown in FIG. 19. For example, the multi-core system 1000 may further include a hardware codec for processing image data, a security block, and the like.

The CPU 1110 executes software (for example, an application program, an operating system (OS), and device drivers) for the multi-core system 1000. The CPU 1110 may execute the operating system (OS) which may be loaded into the working memory 1130. The CPU 1110 may execute various application programs to be driven on the operating system (OS). The CPU 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The processor cores of the CPU 1100 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the operating system (OS) may monitor the number of tasks in a task queue and the driving voltage and the driving clock of the CPU 1110 at specific time intervals to control the CPU 1110. In addition, a kernel of the operating system (OS) may control hotplug-in or hotplug-out of the CPU 1110 with reference to the monitored information. As such, as discussed in more detail below, a DVFS module and a frequency control module may be provided as a portion of the kennel.

The DRAM controller 1120 provides interfacing between the working memory 1130 and the system-on-chip (SoC). The DRAM controller 1120 may access the working memory 1130 according to a request of the CPU 1110 or another intellectual property (IP) block.

The operating system (OS) or basic application programs may be loaded into the working memory 1130 during a booting operation. For example, an OS image stored in the storage device 1170 is loaded into the working memory 1130 based on a booting sequence during booting of the multi-core system 1000. Overall input/output operations of the multi-core system 1000 may be supported by the operating system (OS). The working memory 1130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (Re-RAM), a ferroelectric random-access memory (FRAM), and a NOR flash memory.

The performance controller 1140 may adjust operation parameters of the system-on-chip (SoC) according to a control request provided from the kernel of the operating system (OS). For example, the performance controller 1140 may adjust the level of DVFS to enhance performance of the system-on-chip (SoC). Alternatively, the performance controller 1140 may generate the frequency selection signals to control the frequencies of the processor cores according to a request of the kernel. In this case, the performance controller 1140 may include a performance table PFMT 1142 to set a driving voltage and a frequency of a driving clock therein. The performance controller 1140 may control the PMU 1144 and the CMU 1146, which together form a power managing circuit, connected to the PMIC 1200 to provide the determined driving voltage and the determined driving clock to each power domain.

The user interface controller 1150 controls user input and output from user interface devices. For example, the user interface controller 1150 may display a keyboard screen for inputting data to the LCD 1152 according to the control of the CPU 1110. Alternatively, the user interface controller 1150 may control the LCD 1152 to display data that a user requests. The user interface controller 1150 may decode data provided from user input means, such as the touch panel 1154, into user input data.

The storage interface 1160 accesses the storage device 1170 according to a request of the CPU 1110. For example, the storage interface 1160 provides interfacing between the system-on-chip (SoC) and the storage device 1170. For example, data processed by the CPU 1110 is stored in the storage device 1170 through the storage interface 1160. Alternatively, data stored in the storage device 1170 may be provided to the CPU 1110 through the storage interface 1160.

The storage device 1170 is provided as a storage medium of the multi-core system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The accelerator 1180 may be provided as a separate intellectual property (IP) component to increase the processing speed of a multimedia or multimedia data. For example, the accelerator 1180 may be provided as an intellectual property (IP) component to enhance processing performance of text, audio, still images, animation, video, two-dimensional data or three-dimensional data.

A system interconnector 1190 may be a system bus to provide an on-chip network in the system-on-chip (SoC). The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

As described above, the storage device 1170 may include a read disturbance manager RDM, to uniformalize the read disturbance of the storage device 1170.

Example embodiments disclosed herein may be embodied as a system, method, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Example embodiments of the disclosure may be applied to any electronic devices and systems. For example, the example embodiments of the disclosure may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IOT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the scope of the present disclosure.

What is claimed is:

1. A method of operating a storage device including a plurality of nonvolatile memory devices and a storage controller, comprising:

generating a parity chunk by performing a redundant array of independent disks (RAID) encoding on a plurality of data chunks;

storing a data stripe including the plurality of data chunks and the parity chunk in a plurality of memory blocks included in the plurality of nonvolatile memory devices;

in response to a read request and a determination that an operating state of the storage device is not a sequential read state, performing a direct read operation to directly read the plurality of data chunks from the plurality of nonvolatile memory devices corresponding to addresses included in the read request;

in response to the read request and in response to a determination that the operating state of the storage device is the sequential read state and that a protection chunk is a data chunk, performing an indirect read operation to read one or more of the plurality of data chunks from the plurality of nonvolatile memory devices corresponding to one or more of the addresses included in the read request and generating a target data chunk by performing a RAID decoding based on the one or more of the plurality of data chunks; and transferring the plurality of data chunks read through the direct read operation or the one or more of the plurality of data chunks and the target data chunk through the indirect read operation to another device.

2. The method of claim 1, wherein the indirect read operation is performed regardless of if an error correction code (ECC) decoding is performed on the target data chunk.

3. The method of claim 1, wherein the plurality of data chunks included in the data stripe correspond to consecutive logical addresses of the another device.

4. The method of claim 1, further comprising:

monitoring, based on the read request transmitted from the another device which is a host device, whether the operating state of the storage is the sequential read state in which the plurality of data chunks are sequentially read; and determining the protection chunk to be a target of the indirect read operation when the operating state of the storage device is the sequential read state, wherein the protection chunk is among the plurality of data chunks and the parity chunk.

5. The method of claim 4, wherein the protection chunk is determined such that a read disturbance of the plurality of memory blocks in which the plurality of data chunks and the parity chunk are stored is uniform.

6. The method of claim 4, wherein determining the protection chunk includes:

generating a random number; and determining, as the protection chunk, a chunk corresponding to the random number among the plurality of data chunks and the parity chunk.

7. The method of claim 4, wherein determining the protection chunk includes:

determining, as the protection chunk, one of the plurality of data chunks and the parity chunk by a round robin scheme.

8. The method of claim 4, wherein determining the protection chunk includes:

monitoring a read count representing a number of read operations performed on each of the plurality of memory blocks in which the plurality of data chunks and the parity chunk are stored; and determining, as the protection chunk, a chunk stored in a memory block having a maximum value of the read count value among the plurality of data chunks and the parity chunk.

9. The method of claim 4, wherein determining the protection chunk includes:

monitoring an error bit count of each of the plurality of memory blocks in which the plurality of data chunks and the parity chunk are stored; and determining, as the protection chunk, a chunk stored in a memory block having a maximum value of the error bit count among the plurality of data chunks and the parity chunk.

10. The method of claim 4, wherein when the parity chunk is determined as the protection chunk, the direct read operation is performed with respect to all of the plurality of data chunks.

11. The method of claim 4, wherein when one data chunk of the plurality of data chunks is determined as the protection chunk, the direct read operation is performed with respect to other data chunks except the one data chunk and the indirect read operation is performed with respect to the one data chunk.

12. The method of claim 11, wherein performing the indirect read operation includes:

reading the parity chunk from the plurality of nonvolatile memory devices; and generating the one data chunk as the target data chunk by performing the RAID decoding based on the parity chunk and the other data chunks.

13. The method of claim 11, wherein ECC decoding is performed with respect to the other data chunks, and ECC decoding is omitted with respect to the one data chunk.

14. The method of claim 1, wherein error correction code (ECC) decoding is performed on the target data chunk by the direct read operation, and ECC decoding is not performed on the target data chunk by the indirect read operation.

15. The method of claim 1, wherein the indirect read operation is performed when the operating state of the storage device is a sequential read state in which the plurality of data chunks are sequentially read, or wherein the indirect read operation is performed when the operating state of the storage device is a reclaim operation state in which data of a memory block in which the target data chuck is stored is moved and stored in another memory block.

16. A method of operating a storage device including a plurality of nonvolatile memory devices and a storage controller, comprising:

generating a parity chunk by performing a redundant array of independent disks (RAID) encoding on a plurality of data chunks corresponding to consecutive logical addresses of a host device;

storing a data stripe including the plurality of data chunks and the parity chunk in a plurality of memory blocks included in the plurality of nonvolatile memory devices;

monitoring, based on a read request transmitted from the host device, whether an operating state of the storage device is a sequential read state in which the plurality of data chunks are sequentially read;

when the operating state of the storage device is the sequential read state: determining a protection chunk among the plurality of data chunks and the parity chunk, performing a direct read operation with respect to other data chunks among the plurality of data chunks except for one data chunk determined as the protection chunk by reading the other data chunks corresponding to one or more of the consecutive logical addresses directly from the plurality of nonvolatile memory devices, reading the parity chunk from the plurality of nonvolatile memory devices, and performing an indirect read operation to generate the one data chunk by performing a RAID decoding on the parity chunk based on the other data chunks of the plurality of data chunks; and transferring the other data chunks and the one data chunk to the host device.

17. The method of claim 16, wherein the protection chunk is determined such that a read disturbance of the plurality of memory blocks in which the plurality of data chunks and the parity chunk are stored is uniform.

18. A storage device comprising:

a plurality of nonvolatile memory devices; and a storage controller configured to:

control access to the plurality of nonvolatile memory devices based on a read request transmitted from a host device, in response to the read request and a determination that an operating state of the storage device is not a sequential read state, perform a direct read operation to directly read a plurality of data chunks from the plurality of nonvolatile memory devices corresponding to addresses included in the read request, in response to the read request and in response to a determination that the operating state of the storage device is the sequential read state and that a protection chunk is a data chunk, perform an indirect read operation to read one or more of the plurality of data chunks from the plurality of nonvolatile memory devices corresponding to one or more of the addresses included in the read request and generate a target data chunk by performing a redundant array of independent disks (RAID) decoding based on the one or more of the plurality of data chunks, and transfer the plurality of data chunks read through the direct read operation or the one or more of the plurality of data chunks and the target data chunk through the indirect read operation to the host device.

19. The storage device of claim 18, wherein the plurality of nonvolatile memory devices include NAND flash memory devices.

* * * * *